US 011178374B2

(12) United States Patent
DiVerdi et al.

(10) Patent No.: US 11,178,374 B2
(45) Date of Patent: Nov. 16, 2021

(54) DYNAMICALLY RENDERING 360-DEGREE VIDEOS USING VIEW-SPECIFIC-FILTER PARAMETERS

(71) Applicant: Adobe Inc., San Jose, CA (US)

(72) Inventors: Stephen DiVerdi, Oakland, CA (US);
Seth Walker, San Francisco, CA (US);
Oliver Wang, Seattle, WA (US); Cuong Nguyen, San Francisco, CA (US)

(73) Assignee: ADOBE INC., San Jose, CA (US)

( * ) Notice: Subject to any disclaimer, the term of this patent is extended or adjusted under 35 U.S.C. 154(b) by 32 days.

(21) Appl. No.: 16/428,201

(22) Filed: May 31, 2019

(65) Prior Publication Data

US 2020/0382755 A1    Dec. 3, 2020

(51) Int. Cl.
*H04N 13/111* (2018.01)
*H04N 13/282* (2018.01)
*H04N 13/383* (2018.01)

(52) U.S. Cl.
CPC ......... *H04N 13/111* (2018.05); *H04N 13/282* (2018.05); *H04N 13/383* (2018.05)

(58) Field of Classification Search
CPC .......................... H04N 13/111; H04N 13/282
See application file for complete search history.

(56) References Cited

U.S. PATENT DOCUMENTS

| 2005/0017968 | A1* | 1/2005 | Wurmlin | G06T 17/00 |
| | | | | 345/419 |
| 2013/0135315 | A1* | 5/2013 | Bares | G11B 27/031 |
| | | | | 345/473 |
| 2017/0285737 | A1* | 10/2017 | Khalid | G06F 3/011 |
| 2017/0359570 | A1* | 12/2017 | Holzer | H04N 13/282 |
| 2018/0164593 | A1* | 6/2018 | Van Der Auwera | |
| | | | | H04N 21/816 |
| 2018/0332317 | A1* | 11/2018 | Song | G06F 16/70 |
| 2019/0394444 | A1* | 12/2019 | Oh | H04L 65/80 |
| 2020/0068168 | A1* | 2/2020 | Nowakowski | H04N 5/2628 |

OTHER PUBLICATIONS

Blow, Jonathan, Fun with In-Engine Color Grading, The Witness, http://the-witness.net/news/2012/08/fun-with-in-engine-color-grading/, Aug. 3, 2012.

(Continued)

*Primary Examiner* — Terrell M Robinson
(74) *Attorney, Agent, or Firm* — Keller Jolley Preece

(57) ABSTRACT

This disclosure relates to methods, non-transitory computer readable media, and systems that generate and dynamically change filter parameters for a frame of a 360-degree video based on detecting a field of view from a computing device. As a computing device rotates or otherwise changes orientation, for instance, the disclosed systems can detect a field of view and interpolate one or more filter parameters corresponding to nearby spatial keyframes of the 360-degree video to generate view-specific-filter parameters. By generating and storing filter parameters for spatial keyframes corresponding to different times and different view directions, the disclosed systems can dynamically adjust color grading or other visual effects using interpolated, view-specific-filter parameters to render a filtered version of the 360-degree video.

20 Claims, 12 Drawing Sheets

(56) References Cited

OTHER PUBLICATIONS

Courreges, Adrian, Metal Gear Solid V—Graphics Study, http://www.adriancourreges.com/blog/2017/12/15/mgs-v-graphics-study/, Dec. 15, 2017.
Selan, Jeremy, Using Lookup Tables to Accelerate Color Transformations, GPU Gems 2, Chapter 24, https://developer.nvidia.com/gpugems/GPUGems2/gpugems2_chapter24.html, Apr. 2005.
Bonneel, Nicholas et al., Example-Based Video Color Grading, ACM Transactions on Graphics (Proceedings of SIGGRAPH 2013), https://perso.liris.cnrs.fr/nicolas.bonneel/videostyle.htm.
Lang, Manuel et al., Practical Temporal Consistency for Image-based Graphics Applications, ACM Transactions on Graphics 31(4) • Jul. 2012.
Farbman, Zeev et al., Tonal Stabilization of Video, SIGGRAPH 2011.
Aydin, Tunc Ozan et al., Temporally Coherent Local Tone Mapping of HDR Video, ACM Transactions on Graphics, vol. 33, No. 6, Article 196, Publication Date: Nov. 2014.
Kang, Sing Bing, et al., High Dynamic Range Video, SIGGRAPH '03 ACM SIGGRAPH 2003 Papers, pp. 319-325.
Pouli, Tania et al, VR Color Grading using Key Views, VRIC '18, Apr. 4-6, 2018, Laval, France.

* cited by examiner

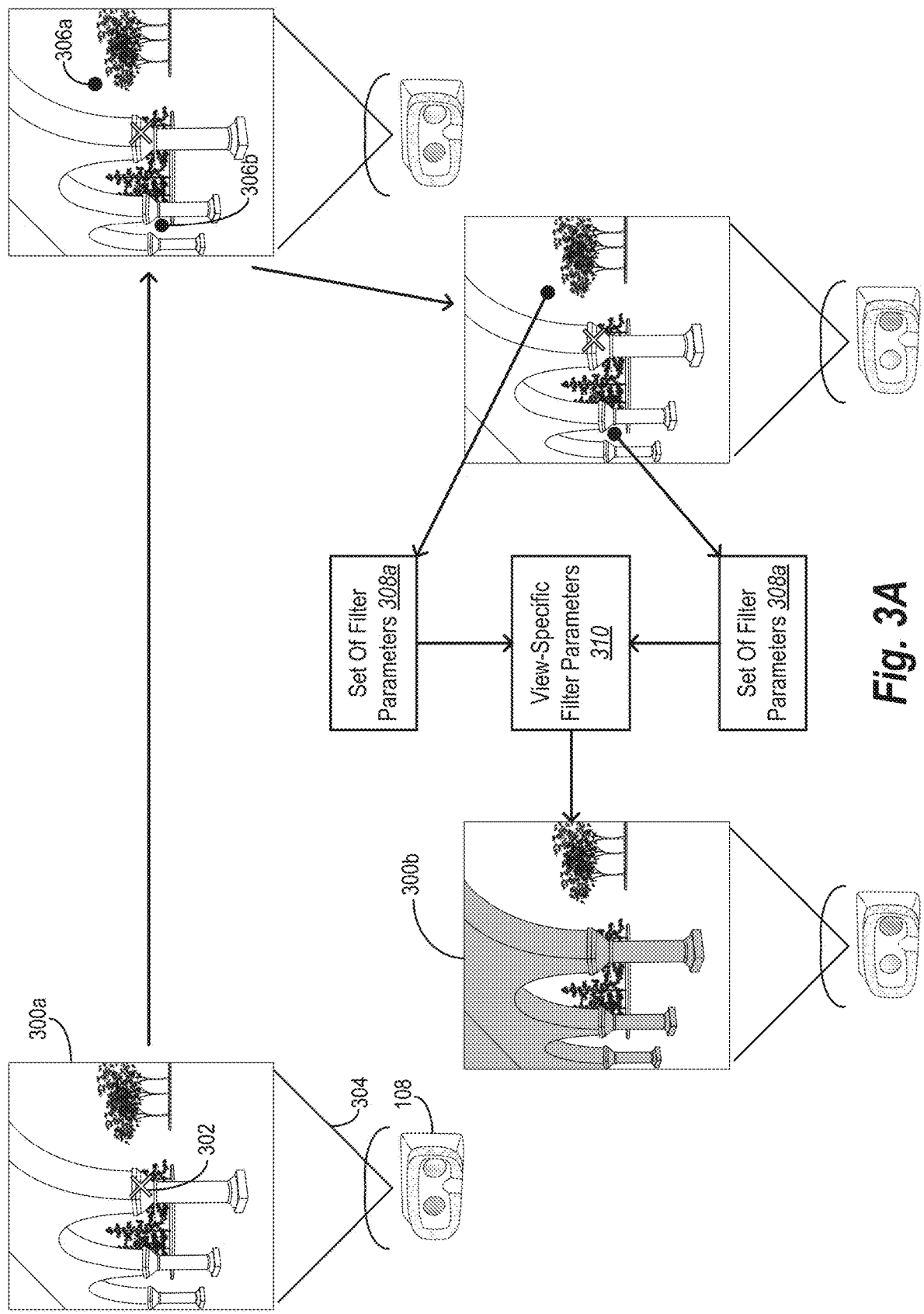

DYNAMICALLY RENDERING 360-DEGREE VIDEOS USING VIEW-SPECIFIC-FILTER PARAMETERS

BACKGROUND

Immersive-video systems increasingly capture and render 360-degree videos for users to experience in a simulation of in-person views. To capture a 360-degree video, a group of cameras (or an omnidirectional camera) simultaneously records a scene from multiple angles or directions and captures 360 degrees of the scene from a camera's view point. By stitching images together, immersive-video systems can merge images into spherical videos often in an equirectangular format with a panoramic view of the scene. When formatted for playback, a head-mounted display, smartphone, or other computing device can project a 360-degree video and adjust the view of video frames based on the orientation of the computing device. But existing immersive-video systems have several technical shortcomings that limit the consistency and customization of visual effects, as well as the flexibility of projecting a scene from 360 degrees.

For example, in some cases, conventional immersive-video systems render views of 360-degree videos with poor and inconsistent light exposure (or views that poorly resemble another visual effect) when adjusting a view of the video based on a computing device's orientation. In certain systems, an immersive-video system captures a 360-degree video showing an object (e.g., a face) illuminated from both an indoor-light source and an outdoor-light source. When a computing device pans to view such an object from the indoor-light source, some conventional immersive-video systems maintain an original light exposure and consequently render the object too darkly. When the computing device pans to view such an object from the outdoor-light source, some conventional immersive-video systems likewise maintain poor light exposure and consequently render the object too brightly. The playback of such a 360-degree video can render an object at different views with coloring too dark (or too bright) for a viewer and inconsistent with a human eye's ability to adjust light exposure.

In addition to inaccurate depictions of lighting and other visual effects, some conventional immersive-video systems use a rigid file format or visual-effects settings that limit frames of a 360-degree video to a single color grading or other visual effect. For example, some conventional immersive-video systems include tools to edit a color grading for pixels of a 360-degree video to fix color-grading values in a video file during playback. In an MP4 file, for instance, each pixel may include fixed color-grading values for particular frames. When a video file fixes the color-grading values or other visual-effect values for pixels, an object can appear to have static color, lighting, or other visual effect in a 360-degree video despite a computing device changing orientation during playback.

While some immersive-video systems attempt to adjust color grading for special effect or to reflect natural lighting conditions, existing systems have inadvertently produced unnatural and distracting depictions in some frames of a 360-degree video. Some existing immersive-video systems, for instance, adjust color-grading values within a video file based on color from other frames in a 360-degree video. But such systems fix the adjusted color-grading values in a video file. When a computing device adjusts a view of an object within a 360-degree video to include indoor or outdoor light sources (or some other color differential), the existing immersive-video system projects a color gradient across a frame of the 360-degree video to give an unnatural and distracting coloring effect to frames changing view.

SUMMARY

This disclosure describes embodiments of methods, non-transitory computer readable media, and systems that solve the foregoing problems in addition to providing other benefits. For example, the disclosed systems can generate and dynamically change filter parameters for a frame of a 360-degree video based on detecting a field of view from a computing device. As a computing device rotates or otherwise changes orientation, for instance, the disclosed systems can detect a field of view and interpolate one or more filter parameters corresponding to nearby spatial keyframes of the 360-degree video to generate view-specific-filter parameters. By generating and storing filter parameters for spatial keyframes corresponding to different times and different view directions, the disclosed systems can dynamically adjust color grading or other visual effects using interpolated, view-specific-filter parameters to render a filtered version of the 360-degree video.

For instance, in some embodiments, the disclosed systems detect a field of view for a viewer of a 360-degree video and identify key-spatial-temporal locations of the 360-degree video corresponding to the field of view. Each such key-spatial-temporal location can have associated filter parameters. The disclosed systems can interpolate the filter parameters associated with the key-spatial-temporal locations to generate view-specific-filter parameters for the field of view. The disclosed systems can then use the view-specific-filter parameters to render a filtered version of the field of view of the 360-degree video. By applying view-specific-filter parameters to pixels of the 360-degree video, the disclosed systems can dynamically render frames from the video with view-specific-color grading, view-specific-blur filtering, or other visual filters or effects based on a field of view.

The following description sets forth additional features and advantages of the disclosed methods, non-transitory computer readable media, and systems, and may make such additional features and advantages obvious or disclose them from the practice of exemplary embodiments.

BRIEF DESCRIPTION OF THE DRAWINGS

The detailed description refers to the drawings briefly described below.

FIG. 3A illustrates a dynamic-video-view system detecting a field of view from a computing device and generating view-specific-filter parameters to render a 360-degree video based on the field of view in accordance with one or more embodiments.

DETAILED DESCRIPTION

Figure 1:
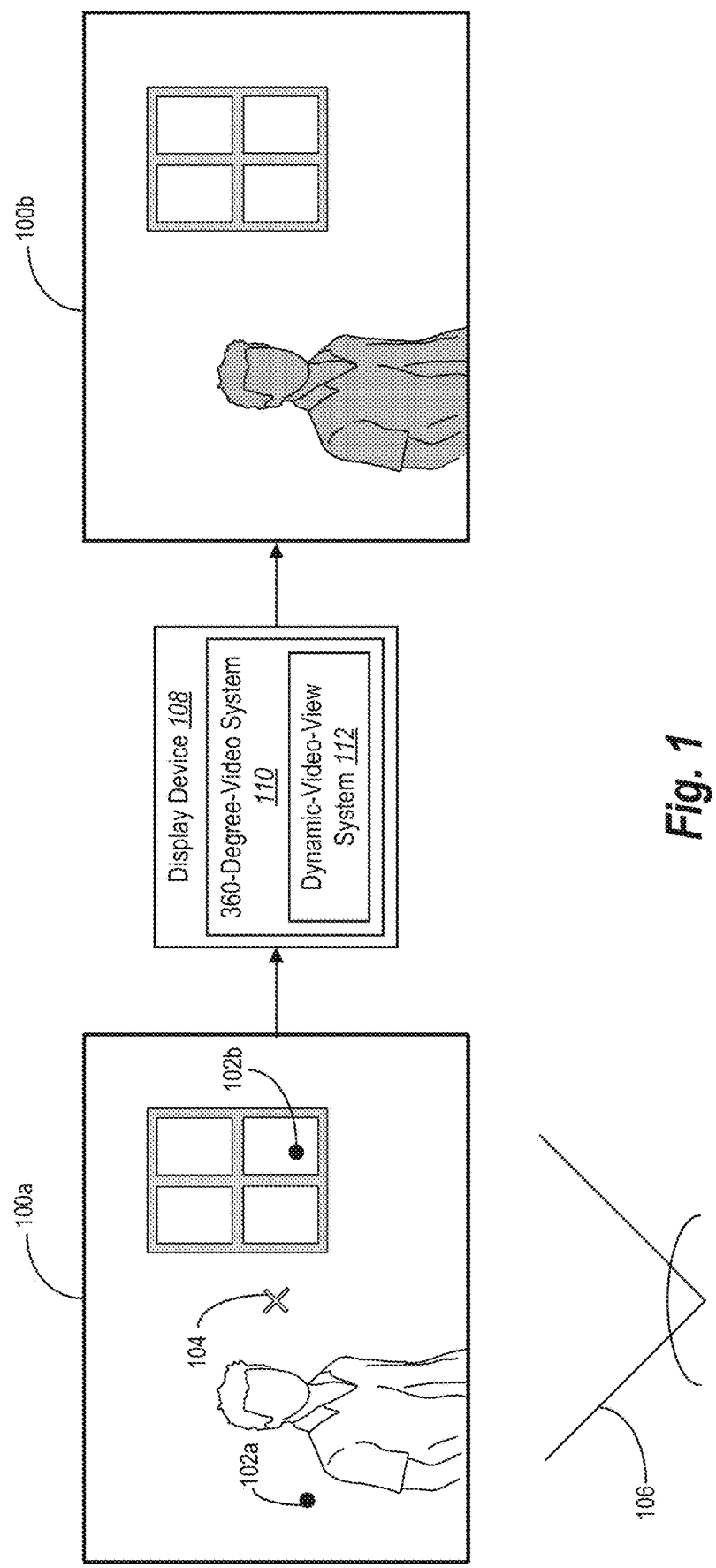
FIG. 1 illustrates a dynamic-video-view system generating view-specific-filter parameters to render a 360-degree video based on a field of view in accordance with one or more embodiments.

This disclosure describes one or more embodiments of a dynamic-video-view system that generates and dynamically changes filter parameters for a frame of a 360-degree video based on detecting a field of view from a computing device during playback. As a computing device rotates or otherwise changes orientation to display frames of a 360-degree video, for instance, the dynamic-video-view system can detect a field of view for a frame of the 360-degree video and interpolate one or more filter parameters corresponding to nearby spatial keyframes to generate view-specific-filter parameters. By generating and storing filter parameters for spatial keyframes corresponding to different times and different view directions, the dynamic-video-view system can dynamically adjust color grading or other visual effects on the fly using interpolated, view-specific-filter parameters to render a filtered version of the 360-degree video.

For instance, in some embodiments, the dynamic-video-view system detects a field of view for a viewer based on a spatial-temporal-viewing location within a 360-degree video. The dynamic-video-view system also identifies key-spatial-temporal locations of the 360-degree video based on a proximity in direction and time to the spatial-temporal-viewing location. The dynamic-video-view system further generates view-specific-filter parameters for the field of view by interpolating filter parameters corresponding to the identified key-spatial-temporal locations. Using the view-specific-filter parameters, the dynamic-video-view system then renders a filtered version of the field of view of the 360-degree video on the computing device.

To dynamically generate such view-specific-filter parameters, in some embodiments, the dynamic-video-view system facilitates editing a video file for a 360-degree video to include filter parameters corresponding to spatial keyframes. For example, the dynamic-video-view system can detect edits to spatial keyframes within a 360-degree video to include filter parameters corresponding to key-spatial-temporal locations within the spatial keyframes. Upon receiving such edits, in certain implementations, the dynamic-video-view system stores filter parameters corresponding to key-spatial-temporal locations in metadata of a video file—separate from frames of the 360-degree video. Because the dynamic-video-view system can store filter parameters separately from frames of the 360-degree video, the video file does not fix or "bake in" filter parameters for particular frames. The dynamic-video-view system instead uses separately stored filter parameters corresponding to spatial keyframes to facilitate generating view-specific-filter parameters on the fly during playback.

As suggested above, the dynamic-video-view system can store and interpolate a variety of different filter parameters to generate a corresponding variety of view-specific-filter parameters. Such filter parameters can affect or control color grading, blur filtering, film-grain filtering, watercolor filtering, gaze guidance, vignetting, or other visual filters or effects. In some embodiments, for example, the dynamic-video-view system interpolates color-grading parameters reflecting adjusted lighting conditions for corresponding key-spatial-temporal locations to generate view-specific-filter parameters. Additionally, or alternatively, the dynamic-video-view system can interpolate blur-filter parameters, film-grain-filter parameters, vignette-filter parameters, or watercolor-filter parameters for corresponding key-spatial-temporal locations to generate view-specific blur-filter parameters, film-grain-filter parameters, vignette-filter parameters, or watercolor-filter parameters, respectively.

Regardless of the type of filter parameter, the dynamic-video-view system can dynamically generate view-specific-filter parameters based on a detected field of view from a computing device. To detect a field of view, in some embodiments, the dynamic-video-view system determines a spatial-temporal-viewing location corresponding to a view direction during playback of the 360-degree video. The dynamic-video-view system further identifies key-spatial-temporal locations based on a proximity in direction (or space) and time of the key-spatial-temporal locations to the spatial-temporal-viewing location. The dynamic-video-view system subsequently uses the identified key-spatial-temporal locations to locate corresponding filter parameters for interpolation.

Both the spatial-temporal-viewing location and key-spatial-temporal locations can come in different formats. For example, in some embodiments, a spatial-temporal-viewing location and a key-spatial-temporal location each include locations in space and time corresponding to a 360-degree video. Alternatively, a spatial-temporal-viewing location and a key-spatial-temporal location each include coordinates for angles of a view direction and a coordinate for time in the 360-degree video.

The dynamic-video-view system can use one or both of a spatial-temporal-viewing location and key-spatial-temporal locations to dynamically change filter parameters for a 360-degree video based on a field of view. In some embodiments, the dynamic-video-view system repeatedly detects fields of view of a 360-degree video from a computing device and, for each detected field of view, renders a new filtered version of a detected field of view of the 360-degree video using newly interpolated view-specific-filter parameters. For example, in certain implementations, the dynamic-video-view system detects an adjusted field of view of the 360-degree video. To generate adjusted view-specific-filter parameters, the dynamic-video-view system subsequently interpolates filter parameters associated with additional key-spatial-temporal locations corresponding to the adjusted field of view. Using the adjusted view-specific-filter parameters, the dynamic-video-view system renders an adjusted filtered version of the adjusted field of view of the 360-degree video. Thus, the dynamic-video-view system can continuously monitor a viewer's field of view and dynamically, in real time, adjust or modify (e.g., apply a filter or color grading) to a 360-degree video as the user watches and navigates the 360-degree video.

As suggested above, the disclosed dynamic-video-view system overcomes several technical deficiencies that hinder conventional immersive-video systems. For example, the dynamic-video-view system increases the flexibility with which an immersive-video system renders frames and visual effects for a 360-degree video. Rather than rely on a rigid file format or fixed filter settings, the dynamic-video-view system introduces a field-of-view-dependent approach to rendering a 360-degree video with color grading or other visual filters by generating view-specific-filter parameters. In other words, the dynamic-video-view system provides flexibility that allows for on-the-fly color grading or other visual filters as a user views a 360-degree video.

By interpolating filter parameters corresponding to nearby spatial keyframes, the dynamic-video-view system generates view-specific-filter parameters during playback of a 360-degree video file. Such view-specific-filter parameters are not found in a rigid file format, but rather generated or adjusted extemporaneously by the dynamic-video-view system. By dynamically generating or changing filter parameters, the dynamic-video-view system modifies color grading, blur filtering, gaze guidance, vignetting, or other visual effects based on runtime-detected fields of view of a 360-degree video. The static filter parameters of conventional immersive-video systems cannot capture such flexible visual filtering.

In addition to dynamically generating filter parameters at run time, in certain implementations, the dynamic-video-view system improves the consistency and customization with which immersive-video systems render visual filters. Unlike conventional systems, the dynamic-video-view system can incrementally adjust and render frames of a 360-degree video as a computing device's field of view changes to include indoor-light sources or outdoor-light sources. While an immersive-video system conventionally uses fixed filter parameters regardless of light-source type, the dynamic-video-view system can adjust filter parameters at runtime to capture more customized coloring, blurring, gaze guidance, vignetting, or other visual effects that reflect a current field of view. A conventional immersive-video system may abruptly jump from one fixed filter parameter to another fixed filter parameter to render an incongruent and inconsistent set of 360-degree-video frames as a field of view changes at runtime. By contrast, the dynamic-video-view system can generate and adjust view-specific-filter parameters to consistently modify 360-degree-video frames to correspond to shifting fields of view of a computing device.

Beyond increased flexibility and customization, in some embodiments, the dynamic-video-view system decreases the file size of sophisticated 360-degree videos and increases editing efficiency of conventional immersive-video systems. To mimic the effect of certain embodiments of the disclosed view-specific-filter parameters in a rigid video file, a conventional immersive-video system must include filter parameters for every field of view at every point of time in a 360-degree video. Such an exhaustive set of filter parameters increases the file size and memory load of a conventional video file. By interpolating filter parameters corresponding to nearby spatial keyframes of a 360-degree video, however, the dynamic-video-view system can generate view-specific-filter parameters on the fly. The dynamic-video-view system accordingly renders a 360-degree video by relying on fewer filter parameters within metadata of a video file than an exhaustive set of fixed filter parameters in a conventional video file. By relying on and interpolating filter parameters corresponding to spatial keyframes, the dynamic-video-view system accordingly decreases the frames for which a video editor creates specific filter parameters.

Turning now to FIG. 1, this figure illustrates a 360-degree-video system 110 and a dynamic-video-view system 112 generating view-specific-filter parameters to render a 360-degree video based on a field of view 106. In general, and as shown in FIG. 1, the dynamic-video-view system 112 system detects the field of view 106 for a viewer corresponding to a frame 100a of a 360-degree video and identifies key-spatial-temporal locations (e.g., key-spatial-temporal locations 102a and 102b) of the 360-degree video corresponding to the field of view 106. The dynamic-video-view system 112 then interpolates filter parameters associated with the key-spatial-temporal locations 102a and 102b to generate view-specific-filter parameters for the field of view 106 and uses the view-specific-filter parameters to render a frame 100b of the 360-degree video comprising a filtered version of the field of view 106.

As just noted, the dynamic-video-view system 112 detects the field of view 106 for a viewer corresponding to the frame 100a of the 360-degree video. As used in this disclosure, the term "field of view" refers to an observable area of a 360-degree video for display on a computing device for a viewer. In some embodiments, for example, a field of view refers to an area of a 360-degree video for display on a computing device as indicated by an orientation of the computing device at a particular time. As shown in FIG. 1, for instance, the field of view 106 includes the frame 100a of the 360-degree video observable on a screen of the display device 108 at a particular time. While FIG. 1 depicts the frame 100a comprising objects from the 360-degree video, the frame 100a may not be visible to a viewer or projected on a screen of the display device 108. For ease of depiction, however, FIG. 1 illustrates the frame 100a comprising objects within the field of view 106 that become visible upon a rendering of the frame 100a.

Relatedly, the term "360-degree video" refers to a video comprising images simultaneously captured from multiple angles or directions by a camera or multiple cameras. In some embodiments, a 360-degree video refers to a video of simultaneously captured images depicting every angle or 360 degrees around a camera (or multiple cameras). In particular, a 360-degree video may constitute an equirectangular projection with a series of equirectangular frames. While the frames 100a and 100b shown in FIG. 1 include illustrations, this disclosure describes a 360-degree video including real images or images of a real world captured by a camera(s).

As further shown in FIG. 1, in some embodiments, the dynamic-video-view system 112 detects the field of view 106 based on a spatial-temporal-viewing location 104 within the frame 100a as indicated by an orientation of the display device 108. For example, in some embodiments, the dynamic-video-view system 112 may determine the spatial-temporal-viewing location 104 from a view-direction vector at a particular time within the 360-degree video.

As used in this disclosure, the term "spatial-temporal-viewing location" refers to a location or an orientation in space and time within a 360-degree video indicating a field of view. For example, in some cases, a spatial-temporal-viewing location includes spatial coordinates corresponding to a center point for a frame of the 360-degree video and a time coordinate or stamp for the frame. A spatial-temporal-viewing location may also include angles of a camera or a computing device. For instance, a spatial-temporal-viewing location can include a pan-angle coordinate for a view-direction vector, a tilt-angle coordinate for the view-direction vector, and a time coordinate corresponding to a frame of the 360-degree video. As indicated by FIG. 1, the dynamic-video-view system 112 detects the spatial-temporal-viewing location 104 based on a view-direction vector from the display device 108.

Having identified the spatial-temporal-viewing location 104, the dynamic-video-view system 112 further identifies the key-spatial-temporal locations 102a and 102b corresponding to the field of view 106. In some cases, the dynamic-video-view system 112 identifies the key-spatial-temporal locations 102a and 102b based on a proximity of the key-spatial-temporal locations 102a and 102b in direction (or space) and time relative to the spatial-temporal-viewing location 104. While FIG. 1 depicts the key-spatial-temporal locations 102a and 102b within the frame 100a, in some embodiments, the dynamic-video-view system 112 identifies one or more key-spatial-temporal locations outside of a field of view or a frame comprising a spatial-temporal-viewing location.

As suggested above, the term "key-spatial-temporal location" refers to a location or an orientation in space and time within a frame of a 360-degree video. For example, in some cases, a key-spatial-temporal location includes spatial coordinates and a time coordinate corresponding a spatial keyframe of a 360-degree video at a particular time of the video. A key-spatial-temporal location may also include angles of a computing device. For instance, a key-spatial-temporal location can include a pan-angle coordinate for a view-direction vector, a tilt-angle coordinate for the view-direction vector, and a time coordinate corresponding to a spatial keyframe of the 360-degree video.

Relatedly, the term "spatial keyframe" refers to a frame within a 360-degree video associated with filter parameters at a particular time. For example, a spatial keyframe includes an equirectangular frame within a 360-degree video comprising at least one key-spatial-temporal location associated with filter parameters. In some embodiments, a video editor or the dynamic-video-view system 112 specifies the filter parameters for key-spatial-temporal locations within spatial keyframes.

As further suggested by FIG. 1, after identifying the key-spatial-temporal locations 102a and 102b, the dynamic-video-view system 112 interpolates a set of filter parameters associated with the key-spatial-temporal location 102a and a set of filter parameters associated with the key-spatial-temporal location 102b. In some embodiments, the dynamic-video-view system 112 interpolates a single set of filter parameters associated with a single key-spatial-temporal location. But the dynamic-video-view system 112 may also interpolate multiple sets of filter parameters corresponding to multiple key-spatial-temporal locations. By interpolating the sets of filter parameters associated with the key-spatial-temporal locations 102a and 102b, for instance, the dynamic-video-view system 112 generates view-specific-filter parameters corresponding to the field of view 106.

The term "filter parameters" refers to codes, coordinates, values, or other parameters indicating a visual filter for locations or pixels within a 360-degree video. For example, in some embodiments, filter parameters refer to codes or values for color grading pixels of a 360-degree video to reflect lighting or other color-grading effects within a frame of the video. As a further example, in certain implementations, filter parameters refer to codes or values that modify pixels of a 360-degree video to resemble a blur filter, a film-grain filter, or a watercolor filter. Regardless of the format for the filter parameters, a set of filter parameters for an associated key-spatial-temporal location may apply to some or all of the pixels within a field of view of a 360-degree video. Relatedly, the term "view-specific-filter parameters" refers to filter parameters specific to a field of view for a 360-degree video. In some embodiments, view-specific-filter parameters refer to filter parameters interpolated at run time of a 360-degree video for a particular field of view.

As further shown in FIG. 1, the 360-degree-video system 110 uses the view-specific-filter parameters to render the frame 100b of the 360-degree video comprising a filtered version of the field of view 106. For example, the 360-degree-video system 110 applies the view-specific-filter parameters to pixels within the frame 100b of the 360-degree video to render the filtered version of the field of view 106 shown in FIG. 1. Accordingly, the frame 100b represents a filtered field of view of the frame 100a from the 360-degree video. While FIG. 1 depicts the 360-degree-video system 110 comprising the dynamic-video-view system 110 and rendering the filtered version of the field of view 106, the dynamic-video-view system 112 alternatively renders such a filtered version by itself.

Figure 2:
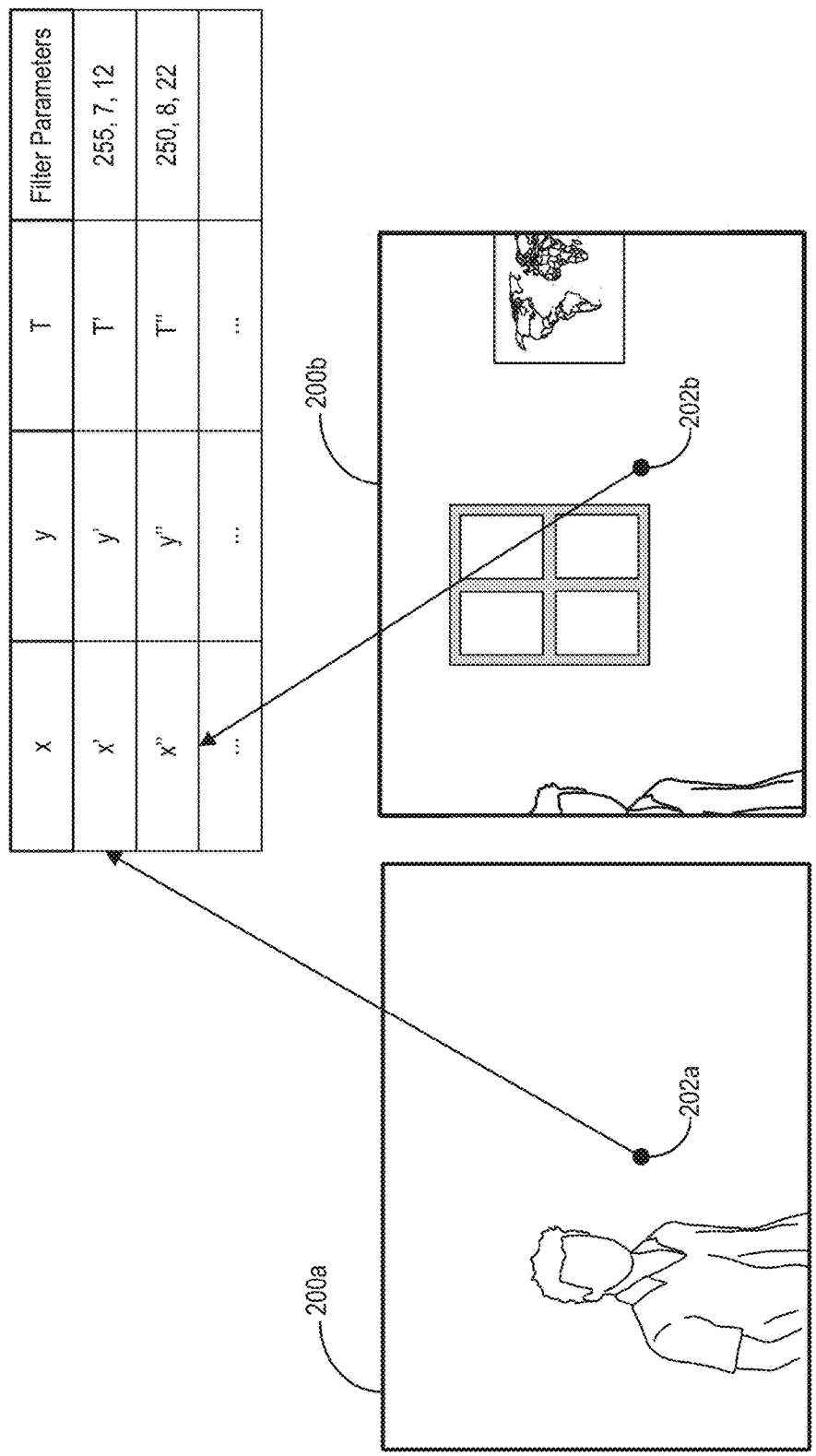
FIG. 2 illustrates a dynamic-video-view system generating and storing film parameters for key-spatial-temporal locations within spatial keyframes of a 360-degree video in accordance with one or more embodiments.

As suggested above, in certain implementations, the dynamic-video-view system 112 facilitates editing a video file for a 360-degree video to include filter parameters corresponding to spatial keyframes. FIG. 2 illustrates the dynamic-video-view system 112 separately selecting key-spatial-temporal locations 202a and 202b from spatial keyframes 200a and 200b of a 360-degree video based on user input. Upon separately receiving a set of filter parameters input by a user for each of the key-spatial-temporal locations 202a and 202b, the dynamic-video-view system 112 stores the sets of filter parameters in a database 206. The dynamic-video-view system 112 can subsequently use the database 206 during playback of the 360-degree video to access the set of filter parameters associated with each of the key-spatial-temporal locations 202a and 202b.

As shown in FIG. 2, the dynamic-video-view system 112 selects the spatial keyframe 200a of the 360-degree video based on detecting or receiving an indication of a user selection of the spatial keyframe 200a. In some embodiments, for example, the dynamic-video-view system 112 provides an editing user interface for display on a screen of the display device 108, where the editing user interface includes options to select individual equirectangular frames from the 360-degree video. Additionally, or alternatively, the dynamic-video-view system 112 suggests or indicates the spatial keyframe 200a of the 360-degree video for editing based on detecting objects within the spatial keyframe 200a (e.g., faces, buildings, vehicles, or other objects) or a measure of light contrast equal to or above a light-contrast threshold.

As further shown in FIG. 2, the spatial keyframe 200a corresponds to a field of view 204a at a particular time of the 360-degree video. As a point of comparison, the spatial keyframe 200b corresponds to a field of view 204b differing from the field of view 204a at a particular time of the 360-degree video. Based on user selections or suggestions from the dynamic-video-view system 112, a spatial keyframe may accordingly correspond to a different field of view but at a same time as another spatial keyframe of the 360-degree video. Conversely, a spatial keyframe may correspond to a same field of view but at a different time as another spatial keyframe of the 360-degree video.

After selecting the spatial keyframe 200a, the dynamic-video-view system 112 selects the key-spatial-temporal location 202a within the spatial keyframe 200a. For example, in some embodiments, the dynamic-video-view system 112 automatically selects a center point within the spatial keyframe 200a as the key-spatial-temporal location 202a. Such a center point may correspond to a center of a view-direction vector for the field of view 204a. In the alternative to automatically selecting a key-spatial-temporal location, in certain implementations, the dynamic-video-view system 112 detects or receives an indication of a user selection of any point within the spatial keyframe 200a and selects such a point as the key-spatial-temporal location 202a for the spatial keyframe 200a.

As suggested above, in some embodiments, the key-spatial-temporal location 202a includes spatial coordinates and a time coordinate respectively identifying locations in space and time within the spatial keyframe 200a. In certain implementations, for instance, the key-spatial-temporal location 202a includes one or more coordinates along a horizontal axis (e.g., x-axis) and one or more coordinates along a vertical axis (e.g., y-axis). Such coordinates may take the form of x-and-y values within an equirectangular frame. Accordingly, the spatial coordinates may correspond to a viewing direction within a 360-degree video. In addition to such spatial coordinates, the key-spatial-temporal location 202a includes a time coordinate corresponding to a time increment or interval for the 360-degree video, such as a time increment or interval corresponding to a frame rate (e.g., measured by frames per second). Accordingly, the key-spatial-temporal location 202a may include a time coordinate in milliseconds, centiseconds, deciseconds, or any other suitable time increment.

As further suggested above, the key-spatial-temporal location 202a may additionally or alternatively include spatial coordinates identifying angles of a camera or a computing device. In addition to a time coordinate, therefore, the key-spatial-temporal location 202a can include a pan-angle coordinate for a view-direction vector and a tilt-angle coordinate for the view-direction vector. The dynamic-video-view system 112 can accordingly use spatial coordinates along axes or spatial coordinates indicating angles to indicate a viewing direction for the key-spatial-temporal location 202a.

As further shown in FIG. 2, the dynamic-video-view system 112 records filter parameters input by a user to associate with (or correspond to) the key-spatial-temporal location 202a within the database 206. In some embodiments, for example, the dynamic-video-view system 112 stores such filter parameters within a table that associates key-spatial-temporal locations with corresponding filter parameters (e.g., in rows and columns). By contrast, in some implementations, the dynamic-video-view system 112 creates key-spatial-temporal-location nodes and filter-parameter nodes within a graph to associate key-spatial-temporal locations with corresponding filter parameters. While FIG. 2 depicts a table as the database 206, the dynamic-video-view system 112 may use any suitable database to store relationships between key-spatial-temporal locations and filter parameters.

As suggested above, the dynamic-video-view system 112 may store a variety of filter parameters within the database 206. For instance, in some embodiments, the dynamic-video-view system 112 stores decimal code, hex code, or other red, green, blue ("RGB") values as filter parameters. Such RGB values can indicate changes to underlying pixels for color grading, blur filtering, film-grain filtering, watercolor filtering, gaze guidance, vignetting, or other visual effects. Regardless of the format for the filter parameters, a set of filter parameters for an associated key-spatial-temporal location may apply to some or all of the pixels within a field of view. For example, the filter parameters for the key-spatial-temporal location 202a may include parameters that apply to all (or nearly all) pixels within the spatial frame 200a for color grading, film-grain filtering, or watercolor filtering. By contrast, the filter parameters for the key-spatial-temporal location 202a may include parameters that apply to only a portion of the pixels within the spatial frame 200a for blur filtering or gaze guidance.

As suggested above, the dynamic-video-view system 112 can store filter parameters for any number of spatial keyframes. As shown in FIG. 2, for instance, the dynamic-video-view system 112 selects the spatial keyframe 200b and the key-spatial-temporal location 202b within the spatial keyframe 200b based on user input. Upon receiving a set of filter parameters for the key-spatial-temporal location 202b input by the user, the dynamic-video-view system 112 stores the set of filter parameters in the database 206. The dynamic-video-view system 112 can subsequently use the database 206 during playback of the 360-degree video to access and interpolate any single set of filter parameters or multiple sets of filter parameters associated with key-spatial-temporal locations to generate view-specific-filter parameters. Alternatively, the dynamic-video-view system 112 stores the filter parameters as XMP metadata in the output MP4 or MOV (or another container format) video file. In any event, the filter parameters provided by the editor are not applied to the video pixels at export time.

During playback, a video player on a computing device (e.g., a head-mounted display) plays the video frames normally in a video viewer, where the head orientation determines the field of view for a frame that is displayed. The video player can then read the XMP metadata storing the spatial keyframe filter parameters. For a given field of view, at some time and some viewing direction, the dynamic-video-view system 112 can interpolate the nearby spatial keyframe filter parameters (e.g., using trilinear interpolation, where one dimension is time and the other two dimensions are viewing direction, or using some other sparse interpolation scheme such as triangulation or radial basis functions). The dynamic-video-view system 112 then applies the interpolated view-specific-filter parameters to the current field of view in real time before presenting the view to the user (e.g., in an OpenGL shader).

FIG. 3A illustrates one such example of the dynamic-video-view system 112 detecting a field of view from a computing device and generating view-specific-filter parameters to render a 360-degree video in accordance with one or more embodiments. As shown in FIG. 3A, the dynamic-video-view system 112 system detects the field of view 304 of a 360-degree video based on an orientation of the display device 108 and identifies key-spatial-temporal locations 306a and 306b of the 360-degree video corresponding to the field of view 304. The dynamic-video-view system 112 subsequently interpolates a set of filter parameters 308a and a set of filter parameters 308b associated with the key-spatial-temporal locations 306a and 306b, respectively, to generate view-specific-filter parameters 310 for the field of view 304. The dynamic-video-view system 112 then uses the view-specific-filter parameters 310 to render a filtered version of the field of view 304 of the 360-degree video.

As just suggested, the dynamic-video-view system 112 detects the field of view 304 corresponding to a frame 300a of the 360-degree video based on an orientation of the display device 108. For example, in certain implementations, the dynamic-video-view system 112 determines a spatial-temporal-viewing location 302 corresponding to a view-direction vector at a particular time within the frame 300a of the 360-degree video. In some embodiments, the dynamic-video-view system 112 computes the view-direction vector to identify a center point of the frame 300a as the spatial-temporal-viewing location 302.

The dynamic-video-view system 112 can compute such a view-direction vector using inputs from the display device 108. For instance, when the display device 108 comprises a head-mounted display that detects pan and tilt angles—or a computing device that detects a change in orientation based on a mouse click or touch gesture—the dynamic-video-view system 112 can identify a center point within the frame 300a based on detected angles, mouse clicks, or touch gestures.

As suggested above, in some embodiments, the spatial-temporal-viewing location 302 includes spatial coordinates and a time coordinate identifying locations in space and time within the frame 300a. In certain implementations, for instance, the spatial-temporal-viewing location 302 includes one or more coordinates along a horizontal axis, one or more coordinates along a vertical axis, and a time coordinate corresponding to a time increment or interval for the 360-degree video. Instead of coordinates along axes, the spatial-temporal-viewing location 302 may include coordinates identifying angles of a camera or a computing device (e.g., pan and tilt angles). The spatial-temporal-viewing location 302 can according include any type of values corresponding to a key-spatial-temporal location.

As further shown in FIG. 3A, the dynamic-video-view system 112 can identify the key-spatial-temporal locations 306a and 306b of the 360-degree video based on a proximity in direction (or space) and time to the spatial-temporal-viewing location 302. By identifying the key-spatial-temporal locations 306a and 306b, the dynamic-video-view system 112 can identify key-spatial-temporal locations associated with filter parameters for interpolation. For instance, in some embodiments, the dynamic-video-view system 112 identifies a threshold number of key-spatial-temporal locations closest to the spatial-temporal-viewing location 302 in space and time within spatial keyframes of the 360-degree video. Alternatively, the dynamic-video-view system 112 identifies up to a threshold number of key-spatial-temporal locations within a space threshold and a time threshold in the 360-degree video.

To identify key-spatial-temporal locations associated with filter parameters for interpolation, for example, the dynamic-video-view system 112 identifies a subset of key-spatial-temporal location within one or both of a threshold spatial distance in an equirectangular frame and a threshold time of the 360-degree video. From among the subset of key-spatial-temporal locations, the dynamic-video-view system 112 can determine (i) differences between spatial coordinates of the spatial-temporal-viewing location 302 and the subset of key-spatial-temporal locations and (ii) differences between time coordinates of the spatial-temporal-viewing location 302 and the subset of key-spatial-temporal locations. The dynamic-video-view system 112 may further apply a different weight or factor to each of the differences to emphasize or deemphasize spatial or temporal differences. Based on the determined differences, the dynamic-video-view system 112 can identify the closest key-spatial-temporal locations in space and time for interpolating filter parameters from among the subset of key-spatial-temporal locations.

Similarly, in some embodiments, the dynamic-video-view system 112 can identify a subset of key-spatial-temporal location within one or both of a threshold angular distance in an equirectangular frame and a threshold time of the 360-degree video. From among the subset of key-spatial-temporal locations, the dynamic-video-view system 112 can determine (i) differences between pan-angle coordinates and tilt-angle coordinates of the spatial-temporal-viewing location 302 and the subset of key-spatial-temporal locations and (ii) differences between time coordinates of the spatial-temporal-viewing location 302 and the subset of key-spatial-temporal locations. The dynamic-video-view system 112 may further apply a different weight or factor to each of the differences to emphasize or deemphasize angular or temporal differences. The dynamic-video-view system 112 subsequently can identify the closest key-spatial-temporal locations in angular differences and time differences for interpolating filter parameters from among the subset of key-spatial-temporal locations.

Regardless of the comparison method used to identify the closest key-spatial-temporal locations within a spatial or angular threshold, the dynamic-video-view system 112 can identify the closest key-spatial-temporal locations up to a threshold number of key-spatial-temporal locations. In some such cases, the dynamic-video-view system 112 identifies any number of key-spatial-temporal locations less than or equal to a threshold number. While FIG. 3A illustrates the dynamic-video-view system 112 identifying the key-spatial-temporal locations 306a and 306b for interpolation of filter parameters, the dynamic-video-view system 112 may identify a single key-spatial-temporal location (or more than two key-spatial-temporal locations) for interpolation of filter parameters in other embodiments.

Figure 3B:
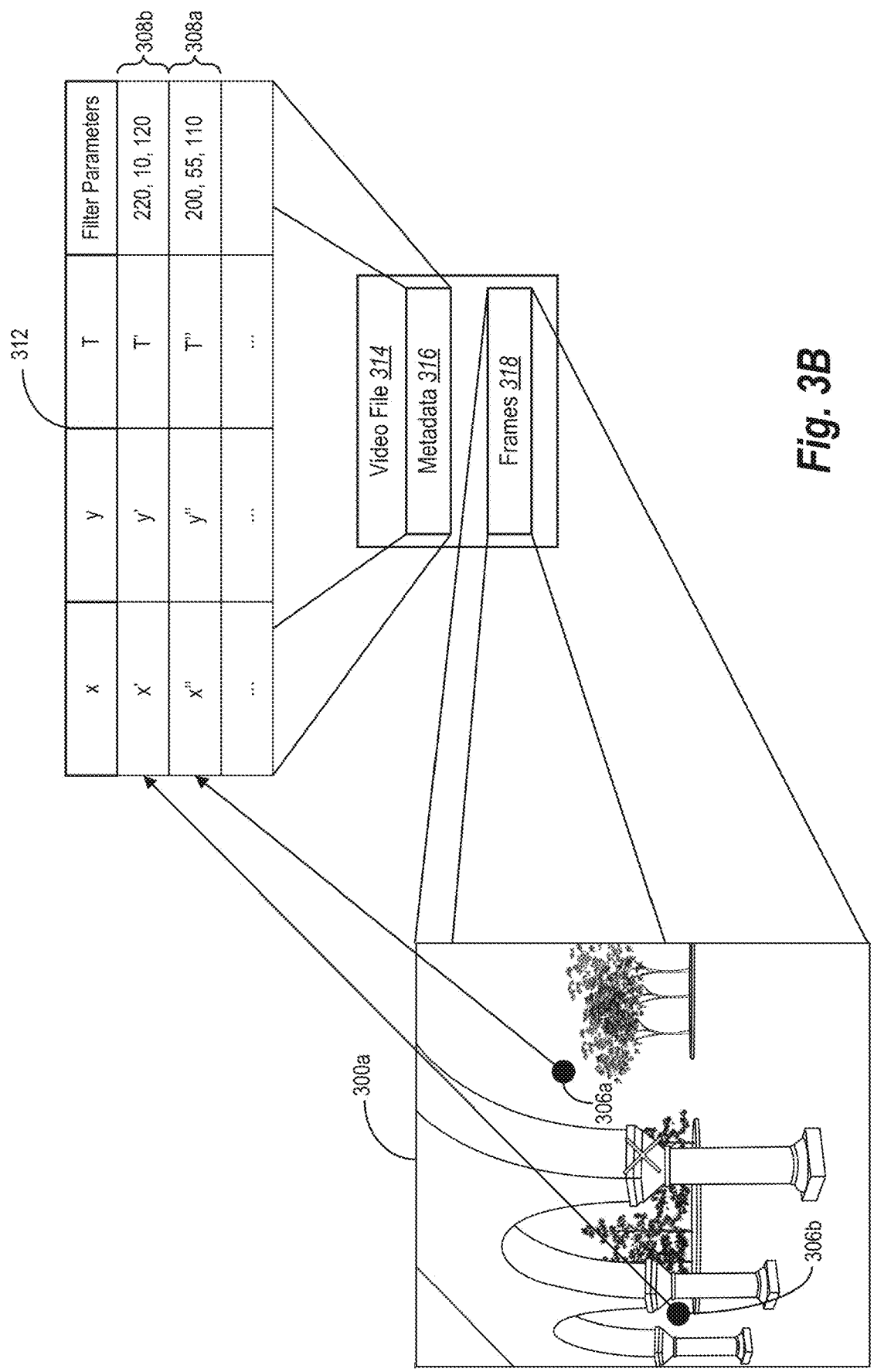
FIG. 3B illustrates a dynamic-video-view system identifying filter parameters associated with key-spatial-temporal locations corresponding to a field of view in accordance with one or more embodiments.

As further shown in FIG. 3A, the dynamic-video-view system 112 identifies the set of filter parameters 308a associated with the key-spatial-temporal location 306a and the set of filter parameters 308a associated with the key-spatial-temporal location 306a. For example, in some cases, the dynamic-video-view system 112 identifies the key-spatial-temporal locations 306a and 306b and corresponding sets of filter parameters 308a and 308b within a table from metadata of a video file. Alternatively, in some embodiments, the dynamic-video-view system 112 searches for tag or pointer associated with the key-spatial-temporal locations 306a and 306b in metadata of a video file to respectively identify the sets of filter parameters 308a and 308b. This disclosure describes an example of identifying filter parameters associated with key-spatial-temporal locations below with reference to FIG. 3B.

As further suggested above, the sets of filter parameters 308a and 308b may apply to some or all of the pixels within a spatial keyframe. For example, the sets of filter parameters 308a and 308b may include parameters that apply to all (or nearly all) pixels within spatial keyframes nearby the frame 300a for color grading, film-grain filtering, or watercolor filtering. By contrast, the sets of filter parameters 308a and 308b may include parameters that apply to only a portion of the pixels within spatial keyframes nearby the frame 300a for blur filtering or gaze guidance.

As further indicated by FIG. 3A, the dynamic-video-view system 112 interpolates the set of filter parameters 308a and the set of filter parameters 308b to generate the view-specific-filter parameters 310 corresponding to the field of view 304. For example, in some embodiments, the dynamicvideo-view system 112 applies trilinear interpolation to interpolate the sets of filter parameters 308a and 308b. When applying trilinear interpolation, the dynamic-video-view system 112 may use time coordinates as a first dimension, spatial or angular coordinates (e.g., x-axis or pan-angle coordinates) as a second dimension, and additional spatial or angular coordinates (e.g., y-axis or tilt-angle coordinates) as a third dimension. In the alternative to trilinear interpolation, the dynamic-video-view system 112 may also apply a sparse interpolation method, such as barycentric coordinate interpolation (e.g., tetrahedralization) or radial-basis functions, or any other suitable interpolation method to interpolate filter parameters from the sets of filter parameters 308a and 308b.

As further shown in FIG. 3A, the dynamic-video-view system 112 uses the view-specific-filter parameters 310 to render a frame 300b of the 360-degree video comprising a filtered version of the field of view 304. For example, the dynamic-video-view system 112 applies the view-specific-filter parameters 310 to some or all of the pixels within the frame 300b of the 360-degree video before rendering the filtered version of the field of view 304. In some such embodiments, the dynamic-video-view system 112 applies the view-specific-filter parameters 310 to the pixels within the frame 300b via a shader (e.g., an OpenGL shader). The frame 300b accordingly represents a filtered field of view of the frame 300a from the 360-degree video.

In addition to rendering the frame 300b of the 360-degree video using the view-specific-filter parameters 310, the dynamic-video-view system 112 can generate and render additional filtered fields of view of the 360-degree video upon detecting additional fields of view. In some embodiments, for example, the dynamic-video-view system 112 repeatedly detects fields of view of the 360-degree video from the display device 108 as the user moves the display device 108. For each detected field of view, the dynamic-video-view system 112 can render a new filtered version of a detected field of view of the 360-degree video using newly interpolated view-specific-filter parameters. In rendering the new filtered version of the detected field of view of the 360-degree video, the dynamic-video-view system 112 can generate each set of interpolated view-specific-filter parameters using the acts depicted in FIG. 3A.

While the dynamic-video-view system 112 can interpolate filter parameters to generate view-specific-filter parameters for any field of view, in some embodiments, the dynamic-video-view system 112 detects a field of view corresponding to a spatial keyframe already associated with filter parameters. Accordingly, the dynamic-video-view system 112 can simply apply a set of filter parameters associated with the spatial keyframe instead of interpolating one or more sets of filter parameters. For example, in some cases, the dynamic-video-view system 112 detects a field of view for a viewer corresponding to a spatial keyframe based on a spatial-temporal-viewing location within a 360-degree video. The dynamic-video-view system also can identify a key-spatial-temporal location of the 360-degree video based on the spatial-temporal-viewing location. The dynamic-video-view system can further apply a set of filter parameters associated with the key-spatial-temporal location to render a filtered version of the field of view of the 360-degree video on the display device 108.

As suggested above, in some embodiments, the dynamic-video-view system 112 identifies filter parameters associated with a key-spatial-temporal location from within a database or other portion of metadata. To facilitate dynamically generating view-specific-filter parameters, the dynamic-video-view system 112 optionally stores filter parameters in metadata separately from frames of a 360-degree video. FIG. 3B illustrates one such example of the dynamic-video-view system 112 identifying the sets of filter parameters 308a and 308b associated with the key-spatial-temporal locations 306a and 306b corresponding to the field of view 304.

As shown in FIG. 3B, the dynamic-video-view system 112 can store metadata 316 of the 360-degree video and frames 318 of the 360-degree video separately within a video file 314. The metadata 316 includes a database 312 that associates key-spatial-temporal locations with filter parameters entered by a user during video editing. Rather than relying on a rigid file format of a conventional video file, the dynamic-video-view system 112 can store filter parameters corresponding to spatial keyframes to facilitate interpolating such filter parameters.

As further shown in FIG. 3B, the dynamic-video-view system 112 can identify the key-spatial-temporal locations 306a and 306b within the database 312. Upon identifying key-spatial-temporal locations, the dynamic-video-view system 112 can further identify the set of filter parameters 308a associated with the key-spatial-temporal location 306a and the set of filter parameters 308a associated with the key-spatial-temporal location 306a within the database 312. As explained above, the dynamic-video-view system 112 subsequently can interpolate the sets of filter parameters 308a and 308b to generate the view-specific-filter parameters 310 shown in FIG. 3A.

As noted above, the dynamic-video-view system 112 can interpolate filter parameters to generate view-specific-filter parameters for a variety of applications. FIGS. 4A-7B illustrate examples of some such applications. In general, FIGS. 4A-7B illustrate the dynamic-video-view system 112 generating view-specific-filter parameters for color grading, blur filtering, rotation around a point, and gaze guidance to render different fields of view of a 360-degree video in accordance with one or more embodiments. In each of FIGS. 4A-7B, the dynamic-video-view system 112 generates view-specific-filter parameters consistent with the disclosure above.

Figure 4B:
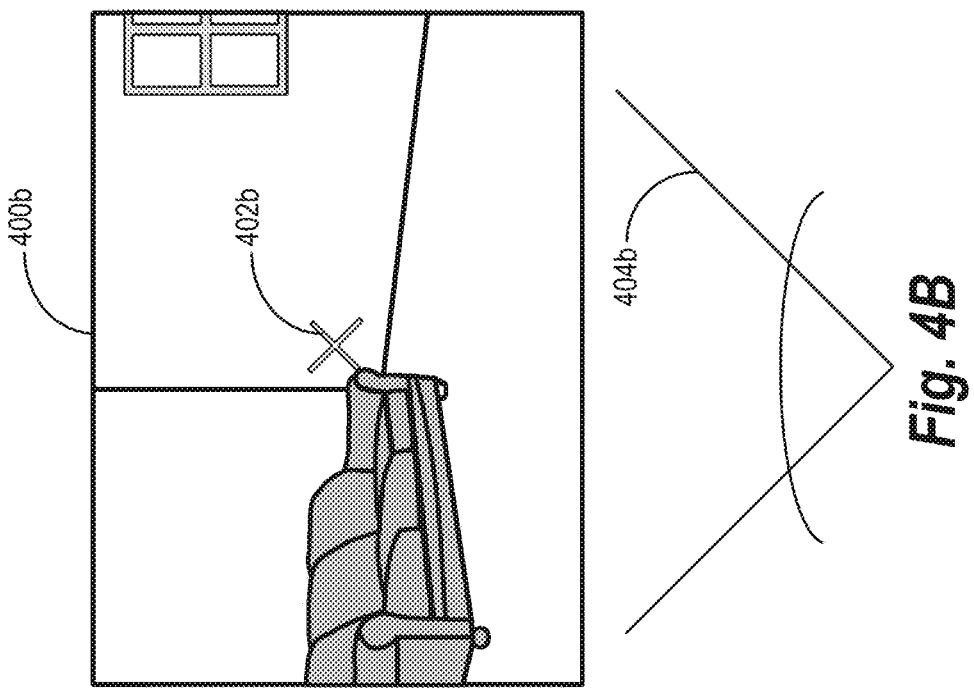
FIGS. 4A-4B illustrate a dynamic-video-view system generating view-specific-color-grading parameters to render different fields of view a 360-degree video in accordance with one or more embodiments.
Figure 4A:
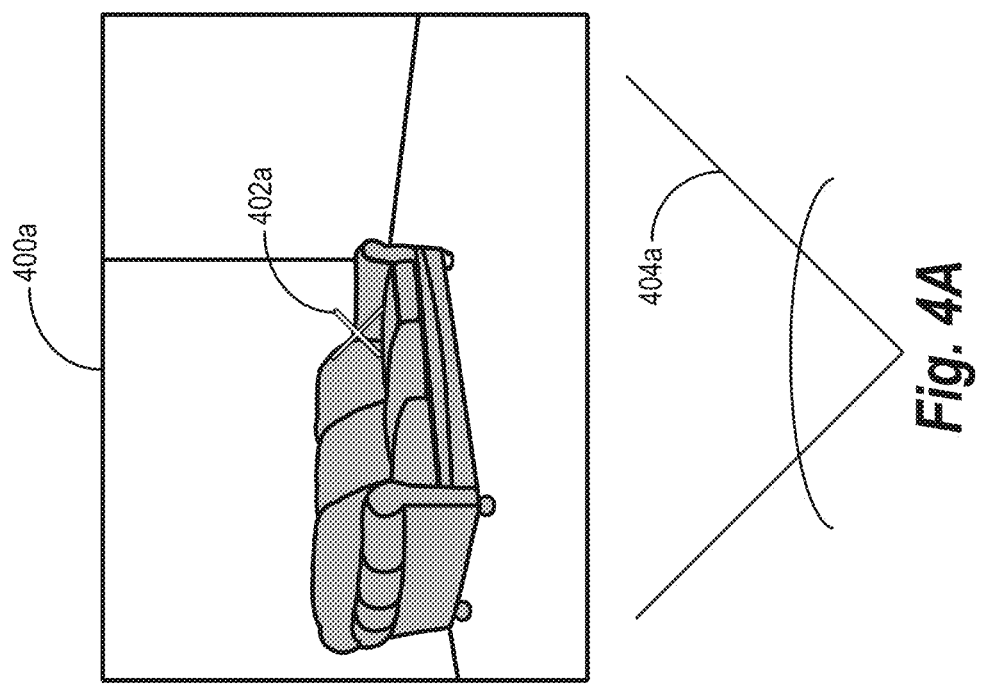

In regard to FIGS. 4A-4B, a video editor may desire to modify the color grading of a 360-degree video. Furthermore, a desired color grading for a given portion of the 360-degree video may change depending upon the field of view. The dynamic-video-view system 112 allows the video editor to provide desired color grading parameters for a relatively small number of frames as described above in relation to FIG. 2. Then at run time, the dynamic-video-view system 112 can detect a current field of view, generate view-specific-filter parameters, and dynamically on the fly provide view-specific-color grading as a user watches and navigates the 360-degree video.

FIGS. 4A-4B illustrate an instance where the dynamic-video-view system 112 color grades a portion of the 360-degree video (i.e., a couch) differently based on the detected field of view. In particular, as discussed below, when the user pans to the right and a window enters the field of view, the presence of light from the window can lead to the dynamic-video-view system 112 modifying the color grading of the couch from an earlier field of view in which the light from the window was not in the field of view.

As shown in FIG. 4A, for example, the dynamic-video-view system 112 can detect an initial field of view 404a of a 360-degree video based on a spatial-temporal-viewing location 402a. The dynamic-video-view system 112 can detect an orientation of a computing device indicating the spatial-temporal-viewing location 402a. The initial field of view 404a includes an object illuminated in whole or in part by an indoor or artificial light source. Upon identifying key-spatial-temporal locations corresponding to the initial field of view 404a, the dynamic-video-view system 112 can interpolate color-grading parameters corresponding to the key-spatial-temporal locations. In some cases, the color-grading parameters reflect adjusted lighting conditions (e.g., modified RGB values that brighten objects too dimly illuminated by an artificial light source).

By interpolating the color-grading parameters, the dynamic-video-view system 112 can generate view-specific-color-grading parameters for the initial field of view 404a. The view-specific-color-grading parameters reflect adjusted lighting conditions for the spatial-temporal-viewing location 402a. In some embodiments, for example, the view-specific-color-grading parameters simulate an adjustment to camera exposure to compensate for an indoor or artificial light source (e.g., a dim artificial light source). As further shown in FIG. 4A, the dynamic-video-view system 112 can render a frame 400a of the 360-degree video corresponding to a filtered version of the initial field of view 404a using the view-specific-color-grading parameters.

FIG. 4B illustrates an adjusted field of view 404b of the same 360-degree video using different view-specific-color-grading parameters. As depicted in FIG. 4B, the dynamic-video-view system 112 can detect the adjusted field of view 404b of the 360-degree video based on an adjusted spatial-temporal-viewing location 402b. The adjusted field of view 404a includes the object illuminated in whole or in part by an outdoor or natural light source (e.g., light coming from a window). To reflect different adjusted lighting conditions in the adjusted field of view 404a, the dynamic-video-view system 112 can identify key-spatial-temporal locations and corresponding color-grading parameters reflecting in whole or in part adjusted lighting conditions for the outdoor or natural light source.

The dynamic-video-view system 112 accordingly can interpolate additional color-grading parameters reflecting adjusted lighting conditions corresponding to additional key-spatial-temporal locations. By interpolating the additional color-grading parameters, the dynamic-video-view system 112 can generate adjusted view-specific-color-grading parameters for the adjusted field of view 404b. The adjusted view-specific-color-grading parameters reflect adjusted lighting conditions for the spatial-temporal-viewing location 402b. In some embodiments, for instance, the adjusted view-specific-color-grading parameters simulate an adjustment to camera exposure to compensate for an outdoor or natural light source (e.g., a bright natural light). The dynamic-video-view system 112 can subsequently render a frame 400b of the 360-degree video corresponding to a filtered version of the adjusted field of view 404b using the adjusted view-specific-color-grading parameters. As shown, the dynamic-video-view system 112 determined and applied different view-specific-color-grading parameters to color grade the initial frame 400a and the adjusted frame 400b.

In addition to using color-grading parameters to reflect changing lighting conditions, in some embodiments, the dynamic-video-view system 112 interpolates color-grading parameters to reflect artistic tinting to simulate an environmental effect or mood. As suggested above, the view-specific-color-grading parameters can simulate a variety of visual effects, including, but not limited to, illustrations of crayon, ink, painting, pastel, charcoal, pencil, pen, or other artistic mediums.

Figure 5B:
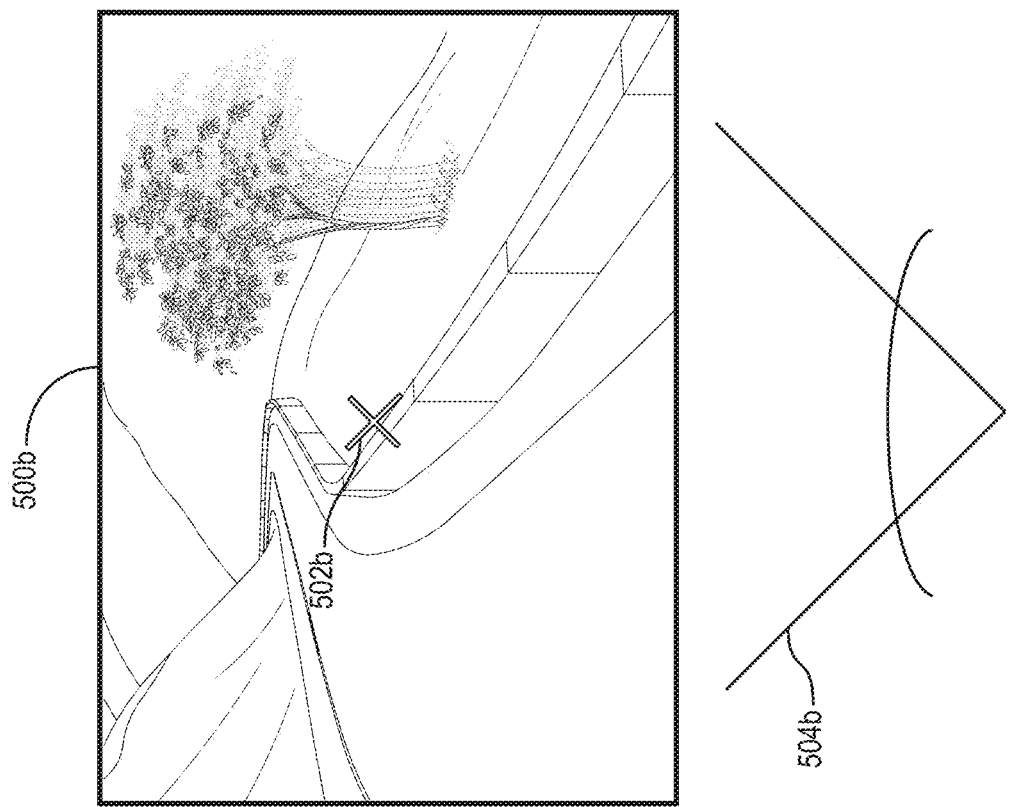
FIGS. 5A-5B illustrate a dynamic-video-view system generating view-specific-blur-filter parameters to render different fields of view of a 360-degree video in accordance with one or more embodiments.
Figure 5A:
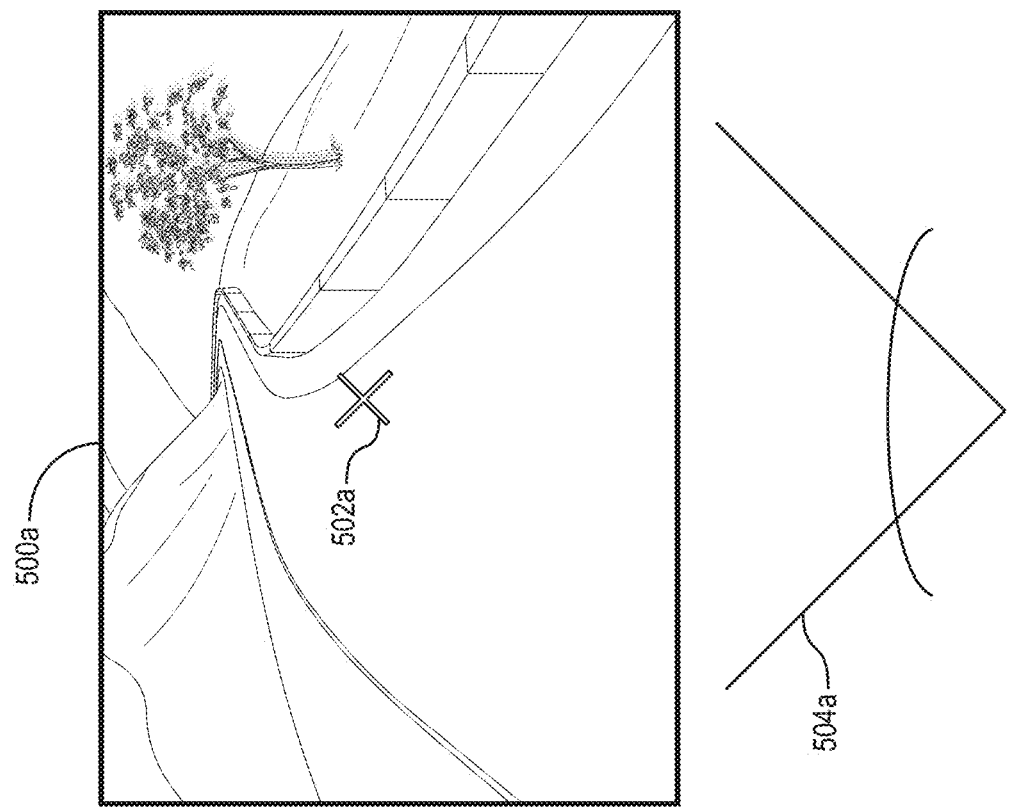

In regard to FIGS. 5A-5B, a video editor may desire to reduce potential motion sickness for a view of a 360-degree video. For example, virtual-reality video often induces motion sickness, particularly when the point of view from which the 360-degree video is captured is moving. The dynamic-video-view system 112 allows the video editor to select an option to provide vignetting, field-of-view reduction, or motion blur-filtering that can apply a filter to rapidly moving objects in the 360-degree video. In particular, at run time, the dynamic-video-view system 112 can detect a current field of view, generate view-specific-filter parameters, and dynamically on the fly provide view-specific-vignette filtering, view-specific-field-of-view reduction, or view-specific-blur filtering as a user watches and navigates the 360-degree video.

FIGS. 5A-5B illustrate an instance where the dynamic-video-view system 112 blurs a portion of the 360-degree video (i.e., a tree) differently based on the detected field of view. In particular, as discussed below, when the user is mainly viewing in the direction of travel (down the road) the dynamic-video-view system 112 applies a blur filter to moving objects in the peripheral portions of the field of view to reduce motion sickness. As the user pans to the right and the field of view moves away from a direction of travel, the dynamic-video-view system 112 can apply increased blurring to reduce the increased possibility of motion sickness.

FIGS. 5A-5B illustrate view-specific-blur-filter parameters for a 360-degree video. As shown in FIG. 5A, the dynamic-video-view system 112 can detect an initial field of view 504a of a 360-degree video based on a spatial-temporal-viewing location 502a. The initial field of view 504a corresponds to a camera (or multiple cameras) moving through a real-world scene in the 360-degree video with objects along or near a periphery. The dynamic-video-view system 112 can identify key-spatial-temporal locations corresponding to the initial field of view 504a associated with blur-filter parameters for blurred objects. In one or more embodiments, the blur-filter parameters indicate how much blur to apply based on a distance from a direction of travel (or a direction opposite to the direction of travel). The dynamic-video-view system 112 interpolates the blur-filter parameters to generate view-specific-blur-filter parameters for the initial field of view 504a.

As indicated by FIG. 5A, the view-specific-blur-filter parameters can cause blurring around the side of the spatial-temporal-viewing location 502a. In some cases, the view-specific-blur-filter parameters can simulate the blurred outlines of objects in the periphery of a camera lens or human eye. In one or more embodiments, the dynamic-video-view system 112 subsequently renders a frame 500a of the 360-degree video corresponding to a filtered version of the initial field of view 504a using the view-specific-blur-filter parameters.

FIG. 5B illustrates an adjusted field of view 504b of the same 360-degree video using different view-specific-blur-filter parameters. As depicted in FIG. 5B, the dynamic-video-view system 112 can detect the adjusted field of view 504b of the 360-degree video based on an adjusted spatial-temporal-viewing location 502b. The adjusted field of view 504a also corresponds to a camera (or multiple cameras) moving through the real-world scene in the 360-degree video, but with objects closer to the adjusted spatial-temporal-viewing location 502b than the objects were in the initial field of view 504a.

To reflect a different blurring effect in the adjusted field of view 504a, the dynamic-video-view system 112 can identify additional key-spatial-temporal locations and additional blur-filter parameters reflecting in whole or in part increased blurring for the objects. Such additional blur-filter parameters may alternatively reflect decreased blurring.

The dynamic-video-view system 112 can interpolate the additional blur-filter parameters corresponding to generate adjusted view-specific-blur-filter parameters for the adjusted field of view 504b. The adjusted view-specific-blur-filter parameters reflect blurring effects corresponding to the spatial-temporal-viewing location 502b. In some cases, for instance, the adjusted view-specific-blur-filter parameters reflect an increased blurring effect as the blurred objects come closer to a center of the adjusted field of view 504b. The dynamic-video-view system 112 can render a frame 500b of the 360-degree video corresponding to a filtered version of the adjusted field of view 504b using the adjusted view-specific-blur-filter parameters.

Figure 6B:
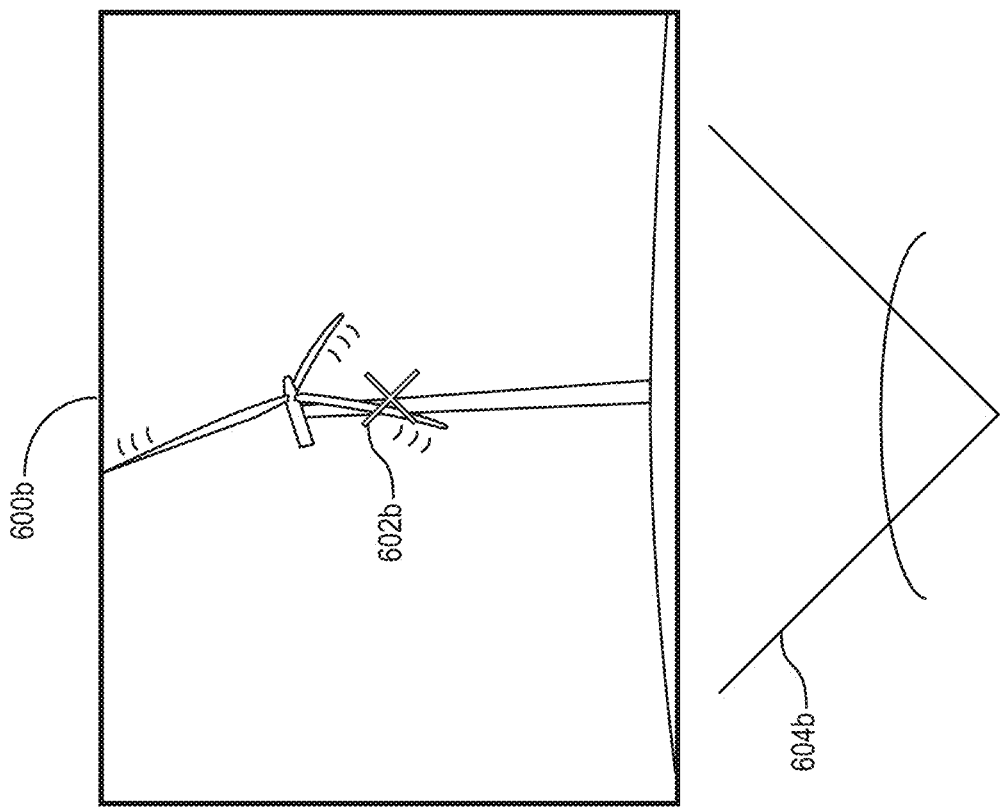
FIGS. 6A-6B illustrate a dynamic-video-view system generating view-specific-blur-filter parameters to render different fields of view rotating around a point in a 360-degree video in accordance with one or more embodiments.
Figure 6A:
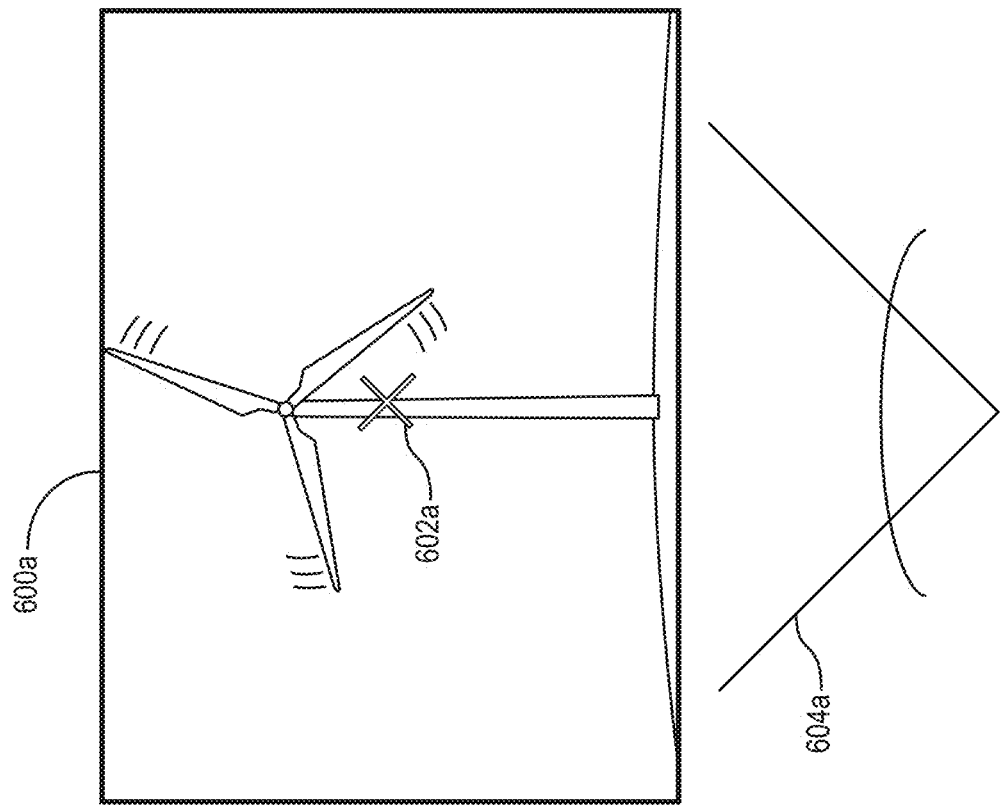

FIGS. 5A-5B deal with applying a view-specific blur filter to reduce motion sickness due to objects moving in a view of a 360-degree video. Along related lines, the dynamic-video-view system 112 can apply a view-specific blur filter to reduce motion sickness due to a field of view moving about an object in a 360-degree video. FIGS. 6A-6B illustrate blur-filter parameters corresponding to key-spatial-temporal locations for rotation around a point in a 360-degree video. As shown in FIG. 6A, for example, the dynamic-video-view system 112 can detect an initial field of view 604a of a 360-degree video based on a spatial-temporal-viewing location 602a. The initial field of view 604a includes an object captured while in motion within the 360-degree video. To facilitate a rotation-dependent approach to field of view, the spatial-temporal-viewing location 602a includes a different set of dimensions. For example, the spatial-temporal-viewing location 602a may include spatial coordinates along a first axis (e.g., horizontal axis or x-axis), spatial coordinates along a second axis (e.g., vertical axis or y-axis), spatial coordinates along a third axis (e.g., azimuth axis or z-axis), and a time coordinate corresponding to a spatial keyframe of the 360-degree video.

The dynamic-video-view system 112 can identify key-spatial-temporal locations corresponding to the initial field of view 604a, where the key-spatial-temporal locations with include dimensions that facilitate detecting rotation. For instance, the key-spatial-temporal locations include the same four dimensions as the spatial-temporal-viewing location 602a in the example above. Having identified such key-spatial-temporal locations, the dynamic-video-view system 112 can interpolate blur-filter parameters associated with the key-spatial-temporal locations to generate view-specific-blur-filter parameters for the initial field of view 604a. The view-specific-blur-filter parameters reflect blurring of the object captured in motion. The dynamic-video-view system 112 can render a frame 600a of the 360-degree video corresponding to a filtered version of the initial field of view 604a using the view-specific-blur-filter parameters.

FIG. 6B illustrates an adjusted field of view 604b rotated around a point within the same 360-degree video using different view-specific-blur-filter parameters (e.g., a point intersecting an x-axis and a y-axis). As depicted in FIG. 6B, the dynamic-video-view system 112 can detect the adjusted field of view 604b rotating around a point within the 360-degree video based on an adjusted spatial-temporal-viewing location 602b. The adjusted field of view 604a includes the same object captured in motion within the 360-degree video, but from a rotated field of view. Similar to the spatial-temporal-viewing location 602a, the adjusted spatial-temporal-viewing location 602b has dimensions that facilitate detecting rotation (e.g., four dimensions). To reflect a different blurring effect in the adjusted field of view 604a, the dynamic-video-view system 112 can identify additional key-spatial-temporal locations and additional blur-filter parameters reflecting in whole or in part increased or decreased blurring of the object in motion.

The dynamic-video-view system 112 can interpolate the additional blur-filter parameters reflecting a different blurring effect to generate adjusted view-specific-blur-filter parameters for the adjusted field of view 604b. The adjusted view-specific-blur-filter parameters can reflect blurring effects corresponding to the spatial-temporal-viewing location 602b. For instance, the adjusted view-specific-blur-filter parameters may reflect a decreased blurring effect (e.g., as the surface area of a moving object becomes less visible). The dynamic-video-view system 112 can render a frame 600b of the 360-degree video corresponding to a filtered version of the adjusted field of view 604b using the adjusted view-specific-blur-filter parameters.

In contrast to conventional videos, 360-degree videos include both portions that are currently visible and in front of a user as well as portions to the side and behind the user that are not currently within the field of view provided by a display device. Due to the configuration of 360-degree videos, a user typically is unable to view the entire video at a given moment in time. Accordingly, a user may miss viewing content of a 360-degree video due to having a field of view turned away from the content. To help reduce a user from missing important, exciting, or other content, the dynamic-video-view system 112 can apply a filter to guide a user to view specific content.

Figure 7B:
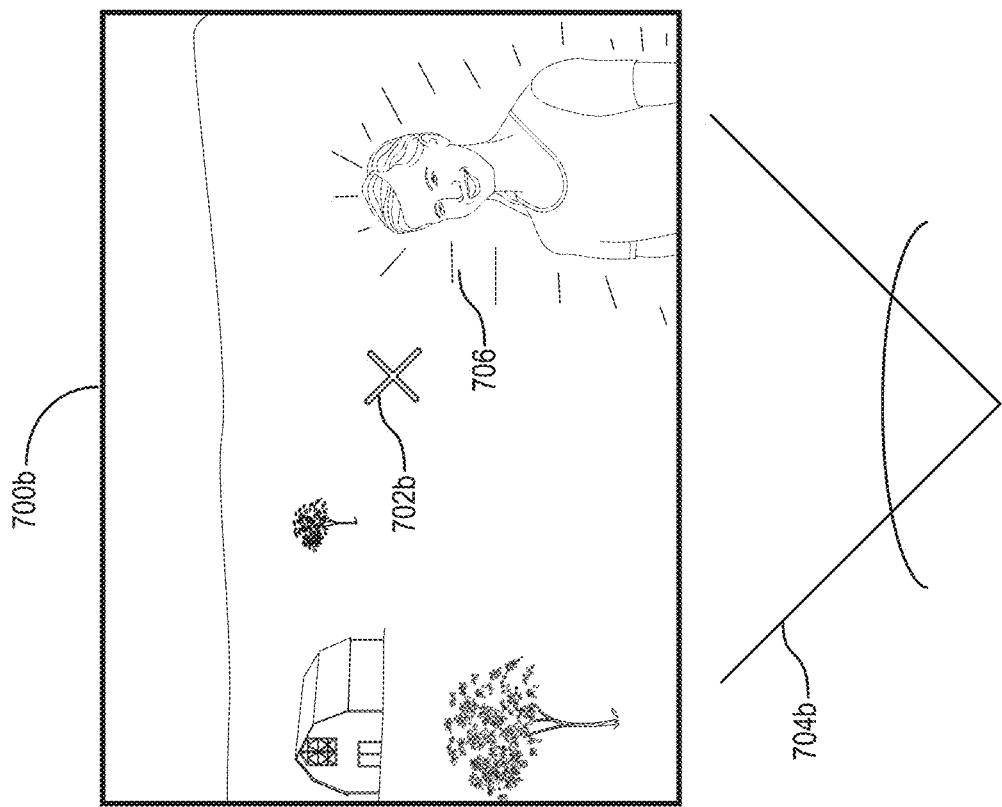
FIGS. 7A-7B illustrate a dynamic-video-view system generating view-specific-gaze-guidance parameters to render different fields of view of a 360-degree video in accordance with one or more embodiments.
Figure 7A:
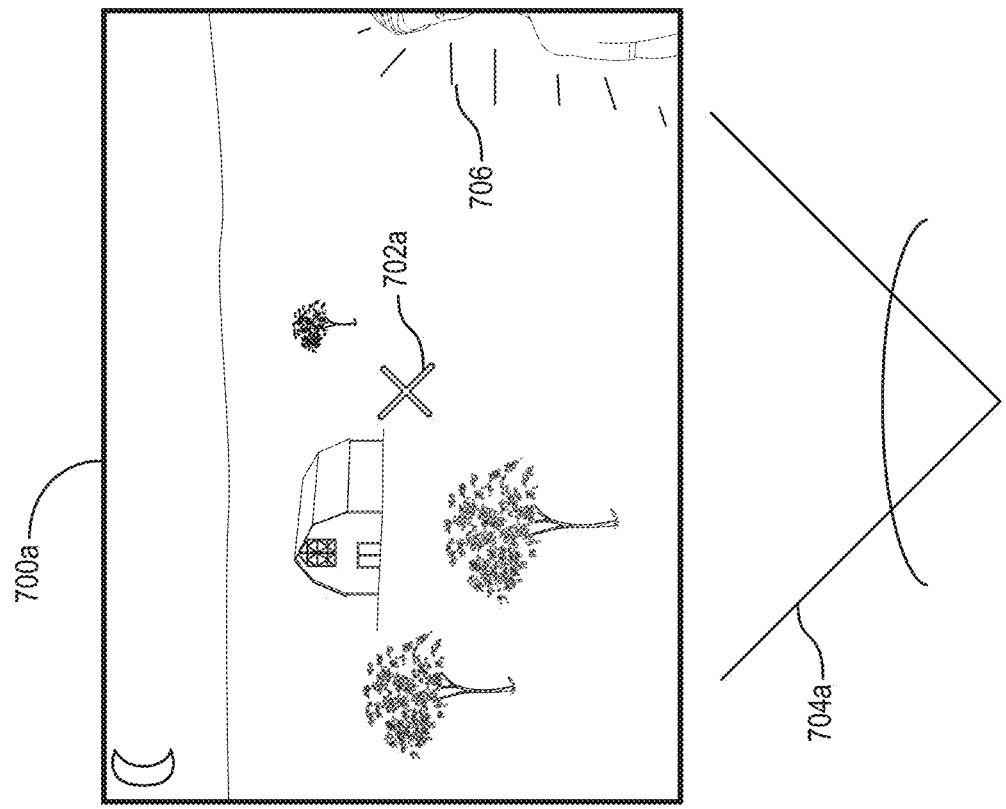

FIGS. 7A-7B illustrate view-specific-gaze-guidance parameters for a 360-degree video to visually guide a viewer to an object or other portion of the video. As shown in FIG. 7A, the dynamic-video-view system 112 detects an initial field of view 704a of a 360-degree video based on a spatial-temporal-viewing location 702a. The initial field of view 704a includes part of an object 706 to which the dynamic-video-view system 112 guides a viewer's gaze or field of view within the 360-degree video. Alternatively, in some embodiments, an initial field of view excludes the object 706 to which the dynamic-video-view system 112 guides a viewer's gaze.

The dynamic-video-view system 112 can identify key-spatial-temporal locations within a proximity of the spatial-temporal-viewing location 702a—and within a relative proximity of the object 706—in space and time. The key-spatial-temporal locations are associated with gaze-guidance parameters that visually guide a viewer to the object 706 within the 360-degree video (e.g., increasingly brighter lighting the closer in proximity a view is to the object 706). The dynamic-video-view system 112 can interpolate the gaze-guidance parameters highlighting or otherwise guiding a gaze toward the object 706 to generate view-specific-gaze-guidance parameters for the initial field of view 704a.

As indicated by FIG. 7A, the view-specific-gaze-guidance parameters can provide coloring, illumination, pattern, tinting, or other visual effects corresponding to the spatial-temporal-viewing location 702a to guide a viewer's attention to the object 706. The dynamic-video-view system 112 can render a frame 700a of the 360-degree video corresponding to a filtered version of the initial field of view 704a using the view-specific-gaze-guidance parameters.

FIG. 7B illustrates an adjusted field of view 704b of the same 360-degree video using different view-specific-gaze-guidance parameters. As depicted in FIG. 7B, the dynamic-video-view system 112 can detect the adjusted field of view 704b of the 360-degree video based on an adjusted spatialtemporal-viewing location 702b. The adjusted field of view 704a includes a larger part (or all) of the object 706 to which a viewer's gaze is guided. To further visually guide a viewer in the adjusted field of view 704a, the dynamic-video-view system 112 can identify additional key-spatial-temporal locations and additional gaze-guidance parameters reflecting in whole or in part (i) different coloring for the object 706, (ii) increased illumination for the object 706, (iii) increased tinting of other objects within the adjusted field of view 704b, or (iv) other increased or decreased visual effects.

The dynamic-video-view system 112 can interpolate the additional gaze-guidance parameters reflecting an adjusted visual effect for gaze guidance to generate adjusted view-specific-gaze-guidance parameters for the adjusted field of view 704b. The adjusted view-specific-gaze-guidance parameters reflect a specific coloring, illumination, pattern, tinting, or other visual effect corresponding to the spatial-temporal-viewing location 702b. Such a specific visual effect may, for example, reflect a more intense visual effect than that shown in the frame 700a. The dynamic-video-view system 112 accordingly renders a frame 700b of the 360-degree video corresponding to a filtered version of the adjusted field of view 704b using the adjusted view-specific-gaze-guidance parameters.

The filter parameters illustrated in FIGS. 4A-7B are merely examples. As noted above, the dynamic-video-view system 112 can store and interpolate a variety of different filter parameters to generate a corresponding variety of view-specific-filter parameters. Such filter parameters can further include, but are not limited to, film-grain-filter parameters and corresponding view-specific-film-grain-filter parameters or watercolor-filter parameters and corresponding view-specific-watercolor-filter parameters.

Figure 8:
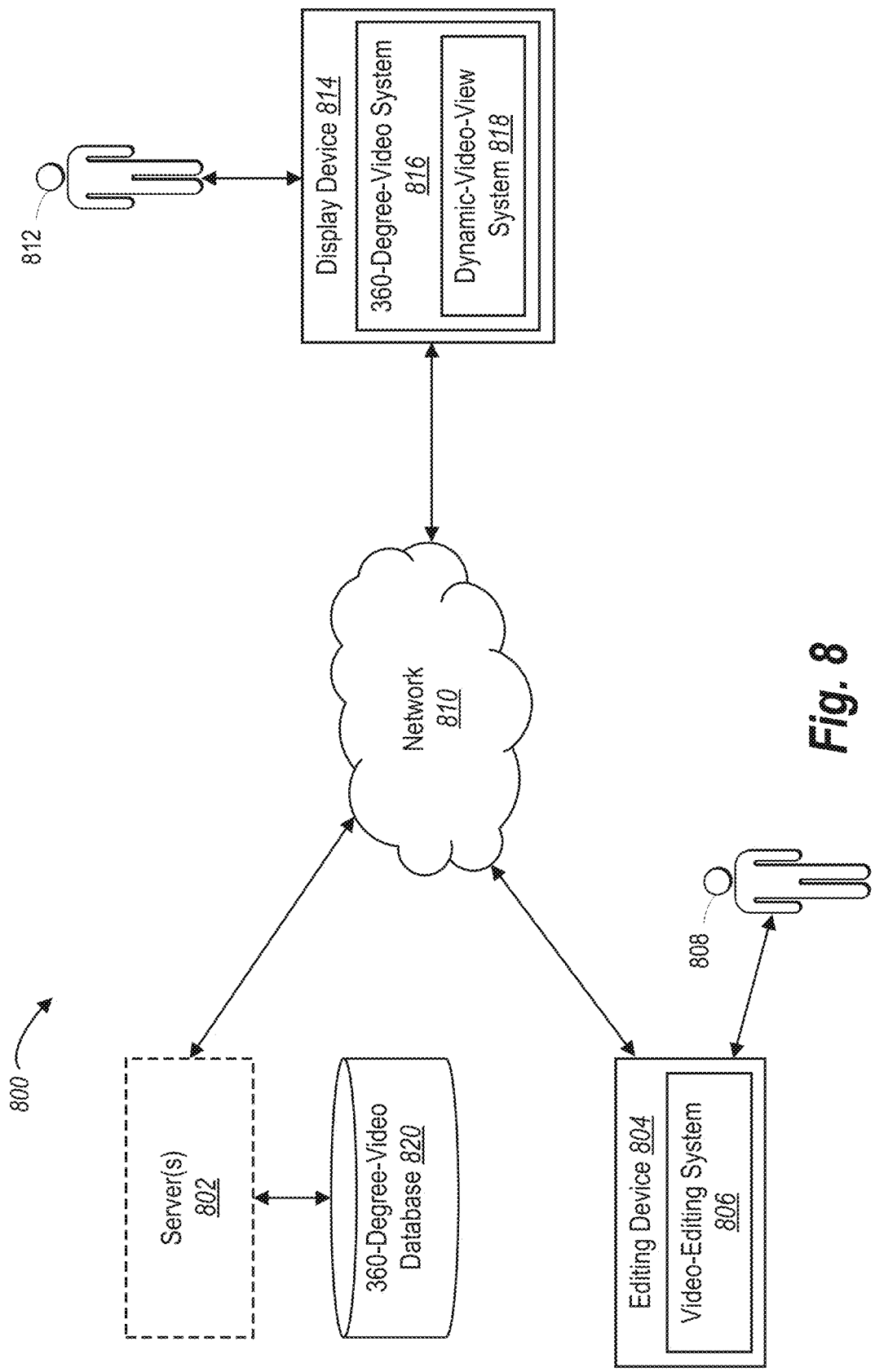
FIG. 8 illustrates a block diagram of an environment in which a video-editing system and a dynamic-video-view system can operate in accordance with one or more embodiments.
Figure 9:
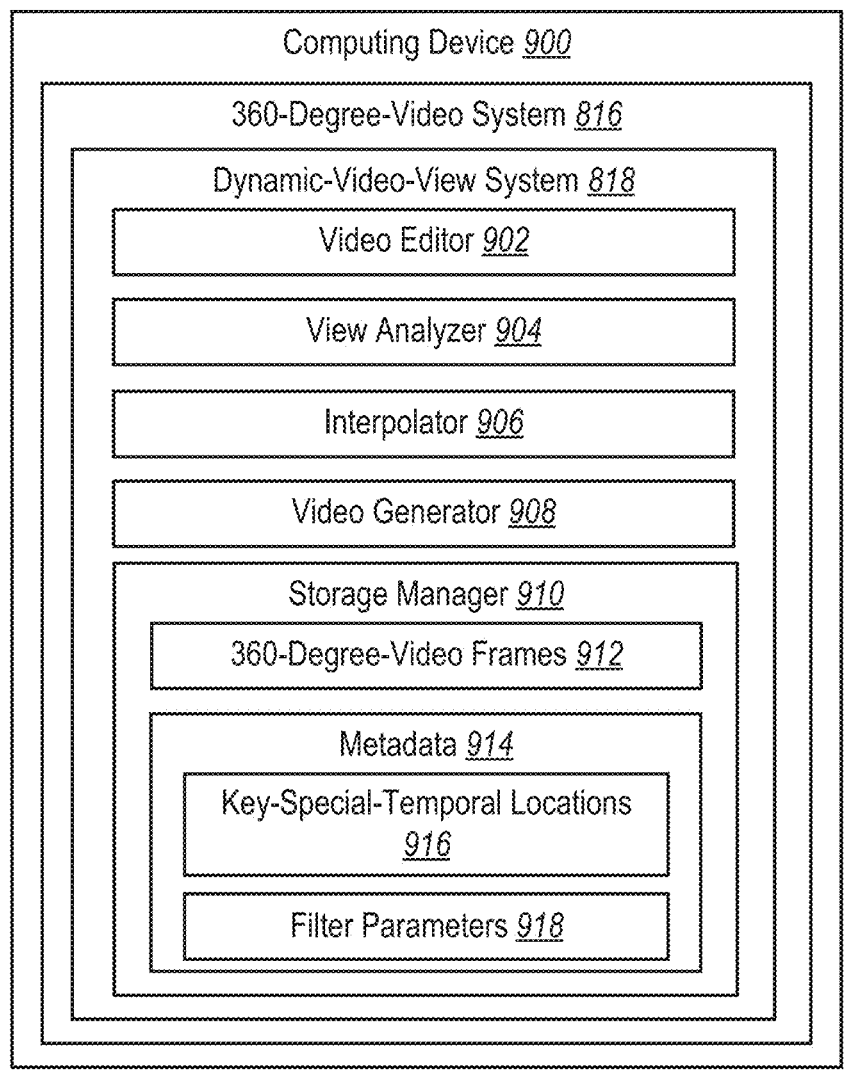
FIG. 9 illustrates a schematic diagram of the dynamic-video-view system of FIG. 8 in accordance with one or more embodiments.

Turning now to FIGS. 8 and 9, these figures provide an overview of an environment in which a dynamic-video-view system can operate and an example of an architecture for the dynamic-video-view system. In particular, FIG. 8 depicts a block diagram illustrating an exemplary system environment ("environment") 800 in which a dynamic-video-view system 818 can operate in accordance with one or more embodiments. Specifically, FIG. 8 illustrates the environment 800 comprising server(s) 802, an editing device 804 and an associated user 808, a network 810, and a display device 814 and an associated user 812. Although FIG. 8 illustrates one editing device one display device each with an associated user, in alternative embodiments, the environment 800 can include any number of editing devices, display devices, and associated users. Similarly, although FIG. 8 illustrates a particular arrangement of the server(s) 802, the editing device 804, the network 810, and the display device 814, various additional arrangements are possible.

As shown in FIG. 8, the server(s) 802, the editing device 804, and the display device 814 may be communicatively coupled with each other either directly or indirectly, such as coupling through the network 810, which is described further below in relation to FIG. 11. The server(s) 802, the editing device 804, and the display device 814 may include any type of computing device, including one or more computing devices as discussed further below in relation to FIG. 11. In some embodiments, the server(s) 802 comprise a data server, a communication server, or a web-hosting server and can generate, store, receive, and/or transmit any type of data, including user inputs requesting a rendering of a 360-degree video or to change a field of view of the 360-degree video. In certain implementations, the editing device 804 and the display device 814 comprise a computing device that allows the user 808 and the user 812 to respectively send and receive digital communications.

As indicated by FIG. 8, in some embodiments, the editing device 804 includes a video-editing system 806. The video-editing system 806 facilitates the generation, modification, accessing, storing, and/or deletion of digital content in 360-degree videos. As its name suggests, the video-editing system 806 further facilitates editing a video file for a 360-degree video, such as by detecting and implementing inputs to store filter parameters corresponding to spatial keyframes. Upon executing instructions from the video-editing system 806, for example, the editing device 804 can select key-spatial-temporal locations from spatial keyframes of a 360-degree video based on user input. Upon receiving a set of filter parameters input by a user for each of the key-spatial-temporal locations, the video-editing system 806 stores the sets of filter parameters in metadata of the video file for the 360-degree video.

As further shown in FIG. 8, the display device 814 can include a 360-degree-video system 816. The 360-degree-video system 816 is an embodiment (and can perform the actions, methods, and processes) of the 360-degree-video system 110 described above. In general, the 360-degree-video system 816 facilitates playback, rendering, and modification of 360-degree videos. In some embodiments, the 360-degree-video system 816 includes a video-editing system 806 and accordingly includes instructions for the display device 814 to perform each of the functions of the editing device 804. Additionally, the 360-degree-video system 816 can use the display device 814 to render frames of a 360-degree video by applying view-specific-filter parameters to pixels of the 360-degree video. Among other things, in certain implementations, the 360-degree-video system 816 uses the display device 814 to receive user inputs identifying a 360-degree video, identify frames of the 360-degree video based on a change in orientation of the display device 814, or identify frames of the 360-degree video based on user input (e.g., mouse click, touch gesture) scrolling through or changing direction within the 360-degree video.

In some embodiments, the 360-degree-video system 816 comprises one or more software applications that allows the user 812 to send and receive digital communications. For example, the 360-degree-video system 816 can be a software application installed on the display device 814 or the editing device 804 or a software application hosted on the server(s) 802. When hosted on the server(s) 802, the 360-degree-video system 816 may be accessed by the display device 814 or the editing device 804 through another application, such as a web browser. In some implementations, the 360-degree-video system 816 includes instructions that, when executed by a processor, cause the display device 814 to present one or more graphical user interfaces, such as user interfaces comprising frames of a 360-degree video for the user 812 to view and for the dynamic-video-view system 818 to modify with view-specific-filter parameters.

In addition (or in the alternative) to editing and rendering videos, the 360-degree-video system 816 can include the dynamic-video-view system 818. The dynamic-video-view system 818 is an embodiment (and can perform the actions, methods, and processes) of the dynamic-video-view system 112 described above. For example, in some embodiments, the dynamic-video-view system 818 uses the display device 814 to detect a field of view for a viewer of a 360-degree video and identify key-spatial-temporal locations of the 360-degree video corresponding to the field of view. Upon identifying such locations, the dynamic-video-view system 818 uses the display device 814 to interpolate the filter parameters associated with the key-spatial-temporal locations and generate view-specific-filter parameters for the field of view. The dynamic-video-view system 818 subsequently uses the display device 814 to render a filtered version of the field of view of the 360-degree video based on the view-specific-filter parameters.

As suggested by previous embodiments, the dynamic-video-view system 818 can be implemented in whole or in part by the individual elements of the environment 800. Although FIG. 8 illustrates the 360-degree-video system 816 and the dynamic-video-view system 818 implemented within the display device 814, components of the 360-degree-video system 816 and the dynamic-video-view system 818 can be implemented in other components of the environment 800. For instance, in some embodiments, the server(s) 802 or the editing device 804 comprise the 360-degree-video system 816 and/or the dynamic-video-view system 818 and perform all of the actions, methods, and processes of the dynamic-video-view system 818 described above and below. This disclosure describes the components of the dynamic-video-view system 818 further below with regard to FIG. 9.

As further illustrated in FIG. 8, the server(s) 802 are communicatively coupled to a 360-degree-video database 820. In one or more embodiments, the server(s) 802 access and query data from the 360-degree-video database 820 associated with requests from the 360-degree-video system 816 or the dynamic-video-view system 818. For instance, the server(s) 802 may access 360-degree videos, frames from 360-degree videos, or key-spatial-temporal locations for the dynamic-video-view system 818. As shown in FIG. 8, the 360-degree-video database 820 is separately maintained from the server(s) 802. Alternatively, in one or more embodiments, the server(s) 802 and the 360-degree-video database 820 comprise a single combined system or subsystem within the server(s) 802.

As just suggested, in some embodiments, the server(s) 802 can use the 360-degree-video database 820 to implement requests from the editing device 804 or the display device 814. For example, in some embodiments, the server(s) 802 receive an indication of a field of view for a viewer of a 360-degree video from the display device 814 and identify key-spatial-temporal locations of the 360-degree video corresponding to the field of view. Upon identifying such locations, the server(s) 802 can further interpolate the filter parameters associated with the key-spatial-temporal locations to generate view-specific-filter parameters for the field of view. The server(s) 802 subsequently use the view-specific-filter parameters to provide to the display device 814 a rendering for a filtered version of the field of view of the 360-degree video.

Turning back now to FIG. 9, this figure provides additional detail regarding components and features of the dynamic-video-view system 818. In particular, FIG. 9 illustrates a computing device 900 implementing the 360-degree-video system 816 and the dynamic-video-view system 818. In some embodiments, the computing device 900 comprises one or more servers (e.g., the server(s) 802). In other embodiments, the computing device 900 comprises one or more client devices (e.g., the editing device 804, the display device 814).

As shown in FIG. 9, the computing device 900 includes the 360-degree-video system 816. In some embodiments, the 360-degree-video system 816 uses its components to perform various video-editing functions or video-rendering functions. Additionally, in some cases, the 360-degree-video system 816 facilitates playback, editing, modification, rendering, and storage of 360-degree videos. For instance, the 360-degree-video system 816 may edit metadata 914 for spatial keyframes of a 360-degree video to include filter parameters input by a user or render the 360-degree video using view-specific-filter parameters.

As further shown in FIG. 9, the computing device 900 includes the dynamic-video-view system 818. The dynamic-video-view system 818 includes, but is not limited to, a video editor 902, a view analyzer 904, an interpolator 906, a video generator 908, and/or a storage manager 910. The following paragraphs describe each of these components in turn.

As just mentioned, the dynamic-video-view system 818 includes the video editor 902. The video editor 902 facilitates the generation, modification, accessing, storing, and/or deletion of digital content in 360-degree videos. For example, in some embodiments, the video editor 902 edits a video file for a 360-degree video, such as by detecting and implementing user inputs to store filter parameters corresponding to spatial keyframes. In certain implementations, the video editor 902 can select and edit key-spatial-temporal locations from spatial keyframes of a 360-degree video to correspond to filter parameters based on user input, as depicted in FIG. 2. The video editor 902 can also communicate with the storage manager 910 to store such filter parameters in the metadata 914 as filter parameters 918 associated with key-spatial-temporal locations 916.

As further shown in FIG. 9, the view analyzer 904 detects or determines a field of view during editing or rendering of 360-degree videos and identifies key-spatial-temporal locations corresponding to a field of view. For example, in some embodiments, the view analyzer 904 detects a field of view for a viewer or an editor based on a spatial-temporal-viewing location within a 360-degree video. In some such embodiments, the view analyzer 904 determines a spatial-temporal-viewing location by identifying spatial coordinates or angular coordinates and a time coordinate corresponding to a center point for a frame of the 360-degree video, as illustrated in FIGS. 1 and 3. Further, in certain implementations, the view analyzer 904 can identify key-spatial-temporal locations of a 360-degree video based on a proximity in direction or space and time to a spatial-temporal-viewing location.

As further shown in FIG. 9, the interpolator 906 identifies filter parameters associated with key-spatial-temporal locations and interpolates filter parameters to generate view-specific-filter parameters. For example, in some embodiments, the interpolator 906 identifies sets of filter parameters from the filter parameters 918 associated with key-spatial-temporal locations from the key-spatial-temporal locations 916 stored in the metadata 914. Additionally, the interpolator 906 applies trilinear interpolation, tetrahedralization, triangulation, a radial-basis function, or other suitable interpolation method to interpolate sets of filter parameters. In some such embodiments, the interpolator 906 identifies and interpolates filter parameters to generate view-specific-filter parameters as illustrated in FIGS. 1, 3, and 4. The interpolator 906 can further generate any of the view-specific-filter parameters illustrated by or described with reference to FIGS. 4A-7B.

As further shown in FIG. 9, the video generator 908 renders frames of 360-degree videos and manages graphical user interfaces of the 360-degree-video system 816. For example, in some embodiments, the video generator 908 renders frames of a 360-degree video from 360-degree-video frames 912 for presentation within a graphical user interface of the computing device 900. In some cases, the video generator 908 applies view-specific-filter parameters to pixels of a 360-degree video to render a frame within a graphical user interface. In some embodiments, the video generator 908 renders filtered versions of field of views of a 360-degree video as illustrated in FIGS. 1, 3, 4A-7B.

In addition to communicating with the video editor 902, the view analyzer 904, the interpolator 906, and the video generator 908, in some embodiments, the storage manager 910 accesses and/or maintains the 360-degree-video frames 912 and the metadata 914. In some such embodiments, for instance, the storage manager 910 separately maintains the 360-degree-video frames 912 and the metadata 914 according to individual video files. Accordingly, the filter parameters 918 for an individual video file are separate from the 360-degree-video frames 912 for a 360-degree video.

In one or more embodiments, each of the components of the dynamic-video-view system 818 are in communication with one another using any suitable communication technologies. Additionally, the components of the dynamic-video-view system 818 can be in communication with one or more other devices including one or more client devices described above. Although the components of the dynamic-video-view system 818 are shown to be separate in FIG. 9, any of the subcomponents may be combined into fewer components, such as into a single component, or divided into more components as may serve a particular implementation. Furthermore, although the components of FIG. 9 are described in connection with the dynamic-video-view system 818, at least some of the components for performing operations in conjunction with the dynamic-video-view system 818 described herein may be implemented on other devices within the environment 100.

Each of the components 902-918 of the dynamic-video-view system 818 can include software, hardware, or both. For example, the components 902-918 can include one or more instructions stored on a computer-readable storage medium and executable by processors of one or more computing devices, such as a client device or server device. When executed by the one or more processors, the computer-executable instructions of the dynamic-video-view system 818 can cause the computing device(s) to perform the methods described herein. Alternatively, the components 902-918 can include hardware, such as a special-purpose processing device to perform a certain function or group of functions. Alternatively, the components 902-918 of the dynamic-video-view system 818 can include a combination of computer-executable instructions and hardware.

Furthermore, the components 902-918 of the dynamic-video-view system 818 may, for example, be implemented as one or more operating systems, as one or more stand-alone applications, as one or more generators of an application, as one or more plug-ins, as one or more library functions or functions that may be called by other applications, and/or as a cloud-computing model. Thus, the components 902-918 may be implemented as a stand-alone application, such as a desktop or mobile application. Furthermore, the components 902-918 may be implemented as one or more web-based applications hosted on a remote server. The components 902-918 may also be implemented in a suite of mobile device applications or "apps." To illustrate, the components 902-918 may be implemented in a software application, including, but not limited to, ADOBE ILLUSTRATOR, ADOBE EXPERIENCE DESIGN, ADOBE CREATIVE CLOUD, ADOBE PHOTOSHOP, ADOBE PREMIERE PRO, PROJECT AERO, or ADOBE LIGHTROOM, "ADOBE," "ILLUSTRATOR," "EXPERIENCE DESIGN," "CREATIVE CLOUD," "PHOTOSHOP," "PROJECT AERO," and "LIGHTROOM" are either registered trademarks or trademarks of Adobe, Inc. in the United States and/or other countries.

Figure 10:
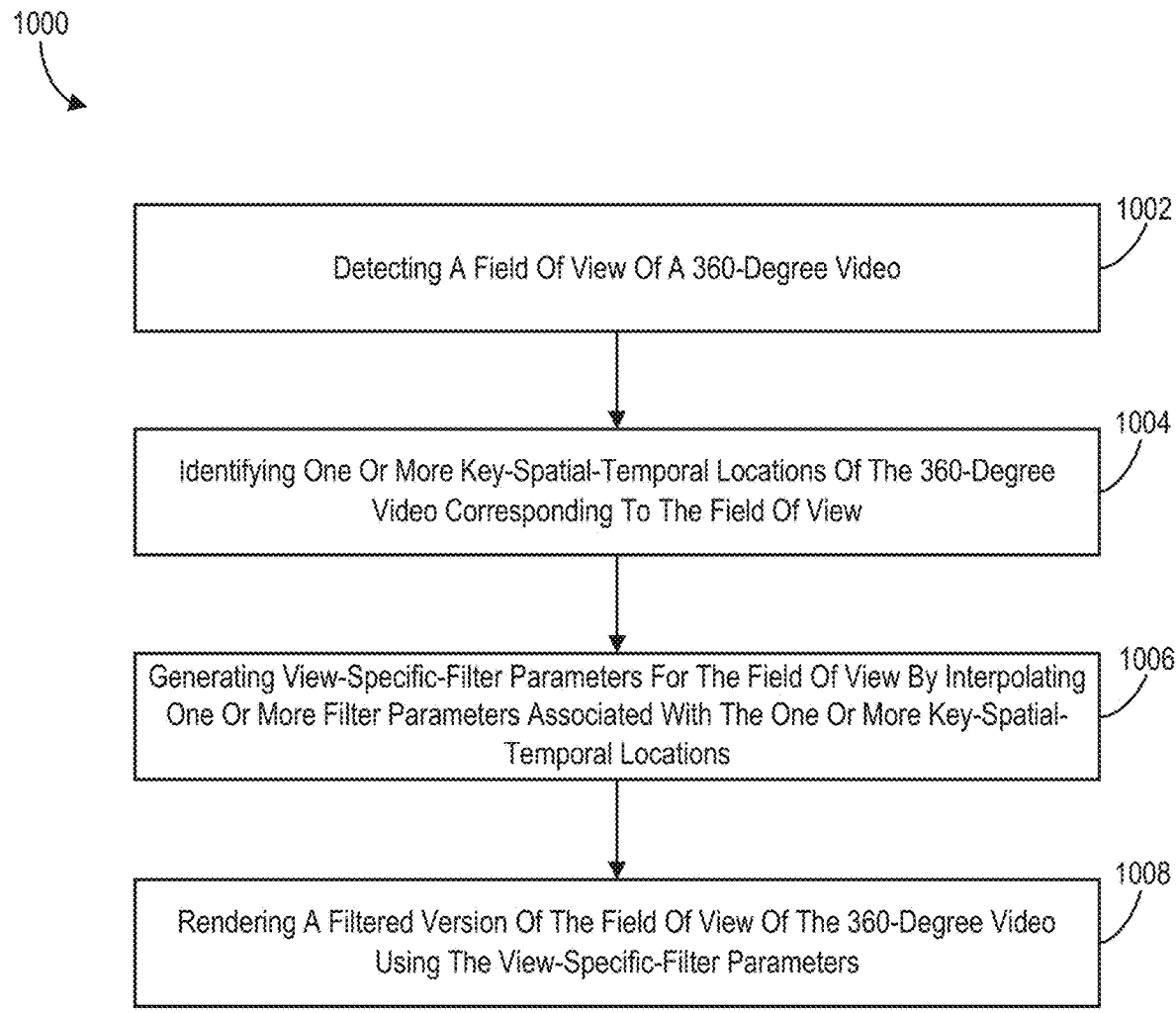
FIG. 10 illustrates a flowchart of a series of acts for generating view-specific-filter parameters to render a 360-degree video based on a field of view in accordance with one or more embodiments.

Turning now to FIG. 10, this figure illustrates a flowchart of a series of acts 1000 of generating view-specific-filter parameters to render a 360-degree video based on a field of view in accordance with one or more embodiments. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer readable storage medium can comprise instructions that, when executed by one or more processors, cause a computing device to perform the acts depicted in FIG. 10. In still further embodiments, a system can perform the acts of FIG. 10.

As shown in FIG. 10, the acts 1000 include an act 1002 of detecting a field of view of a 360-degree video. In particular, in some embodiments, the act 1002 includes detecting a field of view for a viewer based on a spatial-temporal-viewing location within the 360-degree video indicated by an orientation of a display screen. For example, in certain implementations, detecting the field of view for the viewer of the 360-degree video comprises determining a spatial-temporal-viewing location corresponding to a view-direction vector at a particular time within the 360-degree video.

As further shown in FIG. 10, the acts 1000 include an act 1004 of identifying one or more key-spatial-temporal locations of the 360-degree video corresponding to the field of view. In particular, in certain embodiments, the act 1004 includes identifying one or more key-spatial-temporal locations of the 360-degree video corresponding to the field of view, each key-spatial-temporal location having associated filter parameters. The act 1004 may include identifying the one or more key-spatial-temporal locations of the 360-degree video corresponding to the field of view by identifying the one or more key-spatial-temporal locations based on a proximity in direction and time of the one or more key-spatial-temporal locations to the spatial-temporal-viewing location.

In some embodiments, the act 1004 includes identifying a first key-spatial-temporal location and a second key-spatial-temporal location of the 360-degree video based on a proximity in direction and time to the spatial-temporal-viewing location. Further, in some implementations, the one or more key-spatial-temporal locations each comprise spatial coordinates and a time coordinate corresponding to a spatial keyframe of the 360-degree video.

By contrast, in some cases, the first key-spatial-temporal location and the second key-spatial-temporal location each comprise a pan-angle coordinate for a view-direction vector, a tilt-angle coordinate for the view-direction vector, and a time coordinate corresponding to a spatial keyframe of the 360-degree video. Further, in certain implementations, the first key-spatial-temporal location and the second key-spatial-temporal location each comprise spatial coordinates along a first axis, spatial coordinates along a second axis, spatial coordinates along a third axis, and a time coordinate corresponding to a spatial keyframe of the 360-degree video.

As further shown in FIG. 10, the acts 1000 include an act 1006 of generating view-specific-filter parameters for the field of view by interpolating one or more filter parameters associated with the one or more key-spatial-temporal locations. For example, in certain implementations, the act 1006 includes generating view-specific-filter parameters for the field of view by interpolating a first set of filter parameters corresponding to the first key-spatial-temporal location and a second set of filter parameters corresponding to the second key-spatial-temporal location.

As suggested above, in some embodiments, interpolating the one or more filter parameters associated with the one or more key-spatial-temporal locations comprises interpolating one or more color-grading parameters reflecting adjusted lighting conditions for corresponding key-spatial-temporal locations of the 360-degree video. Similarly, in certain implementations, interpolating the first set of filter parameters and the second set of filter parameters comprises interpolating a first set of color-grading parameters reflecting adjusted lighting conditions corresponding to the first key-spatial-temporal location and a second set of color-grading parameters reflecting adjusted lighting conditions corresponding to the second key-spatial-temporal location.

Further, in certain implementations, interpolating the one or more filter parameters associated with the one or more key-spatial-temporal locations comprises interpolating one or more blur-filter parameters, film-grain-filter parameters, vignette-filter parameters, or watercolor-filter parameters for corresponding key-spatial-temporal locations of the 360-degree video. Additionally, in certain implementations, interpolating the one or more filter parameters associated with the one or more key-spatial-temporal locations comprises tri-linearly interpolating the one or more filter parameters associated with the one or more key-spatial-temporal locations.

As indicated above, in some embodiments, generating the view-specific-filter parameters for the field of view comprises generating interpolated color-grading parameters reflecting adjusted lighting conditions for the spatial-temporal-viewing location. Further, in some cases, interpolating the first set of filter parameters and the second set of filter parameters comprises interpolating a first set of gaze-guidance parameters for illuminating the first key-spatial-temporal location and a second set of gaze-guidance parameters for darkening the second key-spatial-temporal location.

As further shown in FIG. 10, the acts 1000 include an act 1008 of rendering a filtered version of the field of view of the 360-degree video using the view-specific-filter parameters. For example, in some embodiments, the act 1008 includes rendering the filtered version of the field of view by applying the view-specific-filter parameters to pixels of a frame of the 360-degree video to render the filtered version of the field of view.

As indicated above, in some embodiments, the view-specific-filter parameters comprise color-grading parameters. Further, in some cases, the view-specific-filter parameters comprise blur-filter parameters, film-grain-filter parameters, vignette-filter parameters, or watercolor-filter parameters for an object within the field of view.

In addition to the acts 1002-1008, in some cases, the acts 1000 further include repeatedly detecting fields of view for the viewer of the 360-degree video; and, for each detected field of view, rendering a new filtered version of a detected field of view of the 360-degree video using newly interpolated view-specific-filter parameters. Similarly, in some embodiments, the acts 1000 further include detecting an adjusted field of view of the 360-degree video comprising an object initially within the field of view; identifying one or more additional key-spatial-temporal locations of the 360-degree video corresponding to the adjusted field of view; interpolating one or more additional filter parameters associated with the one or more additional key-spatial-temporal locations to generate adjusted view-specific-filter parameters for the adjusted field of view; and rendering an adjusted filtered version of the adjusted field of view of the 360-degree video comprising the object using the adjusted view-specific-filter parameters.

Relatedly, in certain implementations, the acts 1000 include detecting a rotation of the field of view around a point within the 360-degree video based on an adjusted orientation of the display screen; identifying the second key-spatial-temporal location and a third key-spatial-temporal location of the 360-degree video corresponding to the rotation of the field of view; generating additional view-specific-filter parameters for the rotation of the field of view by interpolating the second set of filter parameters corresponding to the second key-spatial-temporal location and a third set of filter parameters corresponding to the third key-spatial-temporal location; and rendering an additional filtered version of the 360-degree video corresponding to the rotation of the field of view around the point using the view-specific-filter parameters.

Further, in some implementations, the acts 1000 include detecting an adjusted field of view of the 360-degree video based on an additional orientation of the display screen, the adjusted field of view comprising an object initially within the field of view; identifying the second key-spatial-temporal location and a third key-spatial-temporal location of the 360-degree video corresponding to the adjusted field of view; generating adjusted view-specific-filter parameters for the adjusted field of view by interpolating the second set of filter parameters corresponding to the second key-spatial-temporal location and a third set of filter parameters corresponding to the third key-spatial-temporal location; and rendering an adjusted filtered version of the adjusted field of view of the 360-degree video comprising the object using the adjusted view-specific-filter parameters.

As further suggested above, in some embodiments, the acts 1000 further include accessing the first set of filter parameters and the second set of filter parameters from metadata within a video file for the 360-degree video, the metadata being separate from frames of the 360-degree video.

In addition (or in the alternative) to the acts describe above, in some embodiments, the acts 1000 include a step for generating view-specific-filter parameters for the field of view. The algorithms and acts described in reference to FIG. 3 for identifying key-spatial-temporal locations, identifying sets of filter parameters associated with key-spatial-temporal locations, and interpolating the sets of filter parameters can comprise the corresponding acts for performing a step for generating view-specific-filter parameters for the field of view.

Embodiments of the present disclosure may comprise or utilize a special-purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 11:
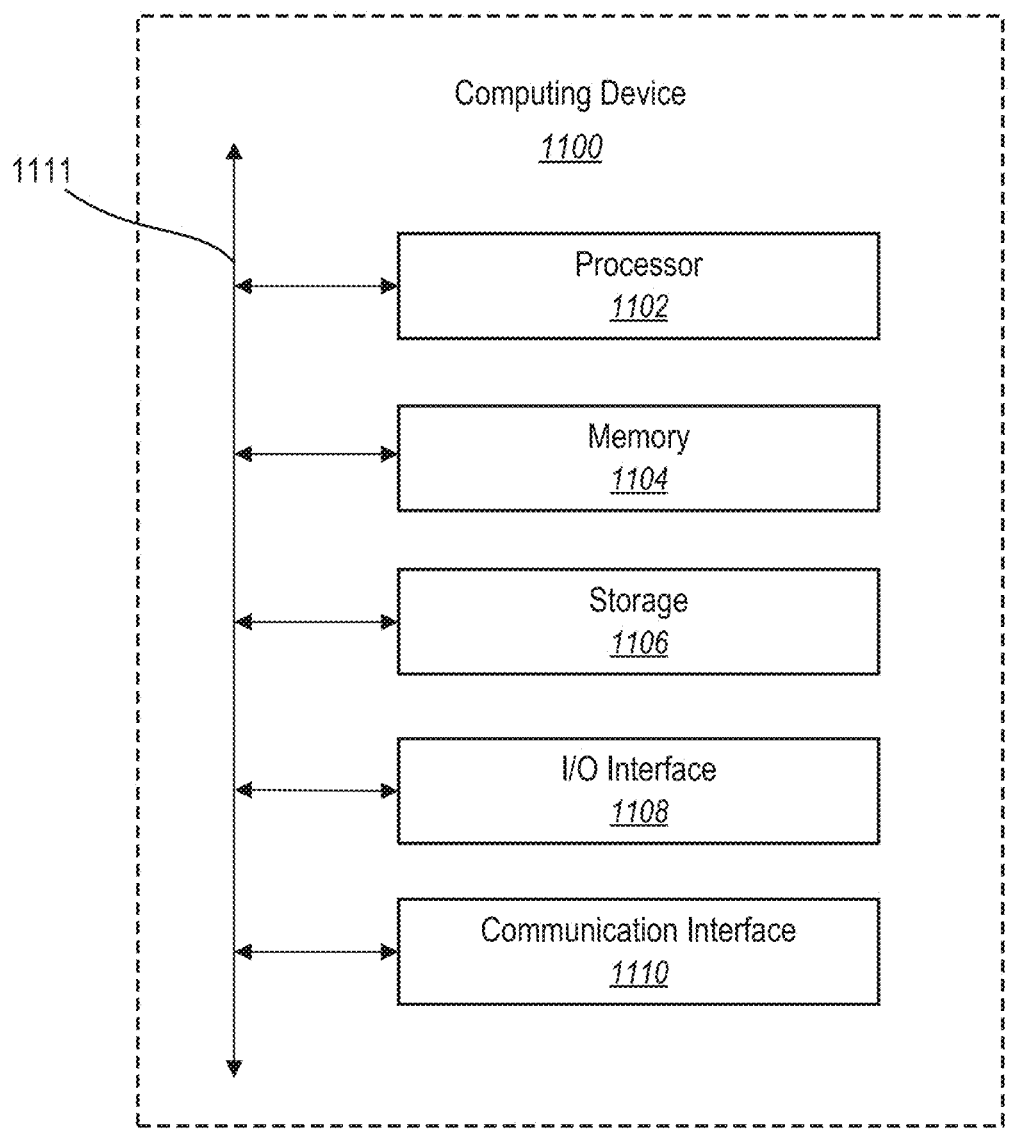
FIG. 11 illustrates a block diagram of an exemplary computing device for implementing one or more embodiments of the present disclosure.

FIG. 11 illustrates a block diagram of exemplary computing device 1100 that may be configured to perform one or more of the processes described above. As shown by FIG. 11, the computing device 1100 can comprise a processor 1102, a memory 1104, a storage device 1106, an I/O interface 1108, and a communication interface 1110, which may be communicatively coupled by way of a communication infrastructure 1112. In certain embodiments, the computing device 1100 can include fewer or more components than those shown in FIG. 11. Components of the computing device 1100 shown in FIG. 11 will now be described in additional detail.

In one or more embodiments, the processor 1102 includes hardware for executing instructions, such as those making up a computer program. As an example, and not by way of limitation, to execute instructions for digitizing real-world objects, the processor 1102 may retrieve (or fetch) the instructions from an internal register, an internal cache, the memory 1104, or the storage device 1106 and decode and execute them. The memory 1104 may be a volatile or non-volatile memory used for storing data, metadata, and programs for execution by the processor(s). The storage device 1106 includes storage, such as a hard disk, flash disk drive, or other digital storage device, for storing data or instructions related to object digitizing processes (e.g., digital scans, digital models).

The I/O interface 1108 allows a user to provide input to, receive output from, and otherwise transfer data to and receive data from computing device 1100. The I/O interface 1108 may include a mouse, a keypad or a keyboard, a touch screen, a camera, an optical scanner, network interface, modem, other known I/O devices or a combination of such I/O interfaces. The I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1108 is configured to provide graphical data to a display for presentation to a user. The graphical data may be representative of one or more graphical user interfaces and/or any other graphical content as may serve a particular implementation.

The communication interface 1110 can include hardware, software, or both. In any event, the communication interface 1110 can provide one or more interfaces for communication (such as, for example, packet-based communication) between the computing device 1100 and one or more other computing devices or networks. As an example and not by way of limitation, the communication interface 1110 may include a network interface controller ("NIC") or network adapter for communicating with an Ethernet or other wire-based network or a wireless NIC ("WNIC") or wireless adapter for communicating with a wireless network, such as a WI-FI.

Additionally, the communication interface 1110 may facilitate communications with various types of wired or wireless networks. The communication interface 1110 may also facilitate communications using various communication protocols. The communication infrastructure 1112 may also include hardware, software, or both that couples components of the computing device 1100 to each other. For example, the communication interface 1110 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected work-flow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

We claim:

1. A non-transitory computer readable medium storing instruction thereon that, when executed by at least one processor, cause a computer system to:
   determine a spatial-temporal-viewing location comprising spatial coordinates and a time coordinate within a 360-degree video corresponding to a current field of view on a display device;
   identify one or more key-spatial-temporal locations comprising one or more spatial coordinates and one or more time coordinates within the 360-degree video that are proximate in direction and time to the spatial coordinates and the time coordinate of the spatial-temporal-viewing location, each key-spatial-temporal location having associated filter parameters;
   based on identifying the one or more key-spatial-temporal locations, interpolate one or more filter parameters associated with the one or more key-spatial-temporal locations to generate view-specific-filter parameters for the current field of view; and
   render a filtered version of the current field of view of the 360-degree video using the view-specific-filter parameters.

2. The non-transitory computer readable medium of claim 1, further comprising instructions that, when executed by the at least one processor, cause the computer system to:
   determine the spatial-temporal-viewing location based on a view-direction vector at the time coordinate within the 360-degree video; and
   identify the one or more key-spatial-temporal locations of the 360-degree video by identifying the one or more key-spatial-temporal locations based on a proximity in direction among the one or more spatial coordinates of the one or more key-spatial-temporal locations to the spatial coordinates of the spatial-temporal-viewing location in three-dimensional space and a proximity in time among the one or more time coordinates of the one or more key-spatial-temporal locations to time coordinate of the spatial-temporal-viewing location.

3. The non-transitory computer readable medium of claim 1, further comprising instructions that, when executed by the at least one processor, cause the computer system to:
   repeatedly determine spatial-temporal-viewing locations corresponding to fields of view on the display device; and
   for each determined spatial-temporal-viewing location corresponding to a detected field of view, render a new filtered version of a detected field of view of the 360-degree video using newly interpolated view-specific-filter parameters.

4. The non-transitory computer readable medium of claim 1, further comprising instructions that, when executed by the at least one processor, cause the computer system to determine the spatial-temporal-viewing location within a frame of the 360-degree video indicated by an orientation of the display device.

5. The non-transitory computer readable medium of claim 1, further comprising instructions that, when executed by the at least one processor, cause the computer system to interpolate the one or more filter parameters associated with the one or more key-spatial-temporal locations by interpolating one or more color-grading parameters reflecting adjusted lighting conditions for corresponding key-spatial-temporal locations of the 360-degree video.

6. The non-transitory computer readable medium of claim 1, further comprising instructions that, when executed by the at least one processor, cause the computer system to interpolate the one or more filter parameters associated with the one or more key-spatial-temporal locations by interpolating one or more blur-filter parameters, film-grain-filter parameters, vignette-filter parameters, or watercolor-filter parameters for corresponding key-spatial-temporal locations of the 360-degree video.

7. The non-transitory computer readable medium of claim 1, further comprising instructions that, when executed by the at least one processor, cause the computer system to interpolate the one or more filter parameters associated with the one or more key-spatial-temporal locations by tri-linearly interpolating the one or more filter parameters associated with the one or more key-spatial-temporal locations.

8. The non-transitory computer readable medium of claim 1, further comprising instructions that, when executed by the at least one processor, cause the computer system to:
- determine an additional spatial-temporal-viewing location within the 360-degree video corresponding to an adjusted field of view on the display device comprising an object initially within the current field of view;
- identify one or more additional key-spatial-temporal locations of the 360-degree video that are proximate in direction and time to the additional spatial-temporal-viewing location corresponding to the adjusted field of view;
- based on identifying the one or more additional key-spatial-temporal locations, interpolate one or more additional filter parameters associated with the one or more additional key-spatial-temporal locations to generate adjusted view-specific-filter parameters for the adjusted field of view; and
- render an adjusted filtered version of the adjusted field of view of the 360-degree video comprising the object using the adjusted view-specific-filter parameters.

9. A system comprising:
- a display screen for a display device;
- at least one processor;
- at least one non-transitory computer readable medium comprising a 360-degree video, filter parameters corresponding to key-spatial-temporal locations, and instructions that, when executed by the at least one processor, cause the system to:
  - determine a spatial-temporal-viewing location comprising spatial coordinates and a time coordinate within a 360-degree video corresponding to a current field of view on the display device based on an orientation of the display screen;
  - identify a first key-spatial-temporal location and a second key-spatial-temporal location of the 360-degree video based on one or more spatial coordinates and one or more time coordinates of the first key-spatial-temporal location and the second key-spatial-temporal location being proximate in direction and time to the spatial coordinates and the time coordinate of the spatial-temporal-viewing location;
  - based on identifying the first key-spatial-temporal location and the second key-spatial-temporal location, generate view-specific-filter parameters for the current field of view by interpolating a first set of filter parameters corresponding to the first key-spatial-temporal location and a second set of filter parameters corresponding to the second key-spatial-temporal location; and
  - render a filtered version of the current field of view of the 360-degree video on the display screen using the view-specific-filter parameters.

10. The system of claim 9, further comprising instructions that, when executed by the at least one processor, cause the system to access the first set of filter parameters and the second set of filter parameters from metadata within a video file for the 360-degree video, the metadata being separate from frames of the 360-degree video.

11. The system of claim 9, wherein the first key-spatial-temporal location and the second key-spatial-temporal location each comprise a pan-angle coordinate for a view-direction vector, a tilt-angle coordinate for the view-direction vector, and a particular time coordinate corresponding to a spatial keyframe of the 360-degree video.

12. The system of claim 9, further comprising instructions that, when executed by the at least one processor, cause the system to:
- interpolate the first set of filter parameters and the second set of filter parameters by interpolating a first set of color-grading parameters reflecting adjusted lighting conditions corresponding to the first key-spatial-temporal location and a second set of color-grading parameters reflecting adjusted lighting conditions corresponding to the second key-spatial-temporal location; and
- generate the view-specific-filter parameters for the current field of view by generating interpolated color-grading parameters reflecting adjusted lighting conditions for the spatial-temporal-viewing location.

13. The system of claim 9, further comprising instructions that, when executed by the at least one processor, cause the system to interpolate the first set of filter parameters and the second set of filter parameters by interpolating a first set of gaze-guidance parameters for illuminating the first key-spatial-temporal location and a second set of gaze-guidance parameters for darkening the second key-spatial-temporal location.

14. The system of claim 9, wherein the first key-spatial-temporal location and the second key-spatial-temporal location each comprise a spatial coordinate along a first axis, a spatial coordinate along a second axis, a spatial coordinate along a third axis, and a particular time coordinate corresponding to a spatial keyframe of the 360-degree video.

15. The system of claim 9, further comprising instructions that, when executed by the at least one processor, cause the system to:
- determining an adjusted spatial-temporal-viewing location corresponding to a rotation of the current field of view around a point within the 360-degree video;
- identify the second key-spatial-temporal location and a third key-spatial-temporal location of the 360-degree video proximate in direction and time to the adjusted spatial-temporal-viewing location corresponding to the rotation of the current field of view;
- based on identifying the second key-spatial-temporal location and the third key-spatial-temporal location, generate additional view-specific-filter parameters for the rotation of the current field of view by interpolating the second set of filter parameters corresponding to the second key-spatial-temporal location and a third set of filter parameters corresponding to the third key-spatial-temporal location; and
- render an additional filtered version of the 360-degree video corresponding to the rotation of the current field of view around the point using the view-specific-filter parameters.

16. The system of claim 9, further comprising instructions that, when executed by the at least one processor, cause the system to:

determine an additional spatial-temporal-viewing location within the 360-degree video corresponding to an adjusted field of view on the display device based on an additional orientation of the display screen, the adjusted field of view comprising an object initially within the current field of view;

identify the second key-spatial-temporal location and a third key-spatial-temporal location of the 360-degree video proximate in direction and time to the additional spatial-temporal-viewing location corresponding to the adjusted field of view;

based on identifying the second key-spatial-temporal location and the third key-spatial-temporal location, generate adjusted view-specific-filter parameters for the adjusted field of view by interpolating the second set of filter parameters corresponding to the second key-spatial-temporal location and a third set of filter parameters corresponding to the third key-spatial-temporal location; and render an adjusted filtered version of the adjusted field of view of the 360-degree video comprising the object using the adjusted view-specific-filter parameters.

17. In a digital medium environment for rendering 360-degree videos, a computer-implemented method of dynamically filtering views of 360-degree videos for various view orientations comprising:

determining a spatial-temporal-viewing location comprising spatial coordinates and a time coordinate within a 360-degree video corresponding to a current field of view on a display device;

identifying one or more key-spatial-temporal locations comprising one or more spatial coordinates and one or more time coordinates within the 360-degree video that are proximate in direction and time to the spatial coordinates and the time coordinate of the spatial-temporal-viewing location, each key-spatial-temporal location having associated filter parameters;

based on identifying the one or more key-spatial-temporal locations, interpolating one or more filter parameters associated with the one or more key-spatial-temporal locations to generate view-specific-filter parameters for the current field of view; and rendering a filtered version of the current field of view of the 360-degree video using the view-specific-filter parameters.

18. The method of claim 17, wherein the view-specific-filter parameters comprise color-grading parameters.

19. The method of claim 17, wherein the view-specific-filter parameters comprise blur-filter parameters, film-grain-filter parameters, vignette-filter parameters, or watercolor-filter parameters for an object within the current field of view.

20. The method of claim 17, wherein rendering the filtered version of the current field of view comprises applying the view-specific-filter parameters to pixels of a frame of the 360-degree video to render the filtered version of the current field of view.

* * * * *